United States Patent
Thiele et al.

(10) Patent No.: US 12,515,798 B2
(45) Date of Patent: *Jan. 6, 2026

(54) AIRCRAFT-SEAT ASSEMBLY

(71) Applicant: RECARO Aircraft Seating GmbH & Co. KG, Schwaebisch Hall (DE)

(72) Inventors: Maik Thiele, Stuttgart (DE); Christopher Chilcott, Schwaebisch-Hall (DE); Hermann Hoffmann, Schwaebisch Hall (DE); Heiko Minzer, Schwaebisch Hall (DE); Violina Mikova, Schwaebisch Hall (DE); Philipp Weng, Schwaebisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 68 days.

This patent is subject to a terminal disclaimer.

(21) Appl. No.: 18/572,374

(22) PCT Filed: Jul. 12, 2022

(86) PCT No.: PCT/EP2022/069489
§ 371 (c)(1),
(2) Date: Jul. 22, 2024

(87) PCT Pub. No.: WO2023/285473
PCT Pub. Date: Jan. 19, 2023

(65) Prior Publication Data
US 2024/0367796 A1    Nov. 7, 2024

(30) Foreign Application Priority Data

Jul. 12, 2021 (DE) ..................... 10 2021 117 964.5

(51) Int. Cl.
*B64D 11/06* (2006.01)

(52) U.S. Cl.
CPC ...... *B64D 11/0601* (2014.12); *B64D 11/0606* (2014.12); *B64D 11/0641* (2014.12); *B64D 11/0644* (2014.12)

(58) Field of Classification Search
CPC ............ B64D 11/0601; B64D 11/0606; B64D 11/0641; B64D 11/0644
See application file for complete search history.

(56) References Cited

U.S. PATENT DOCUMENTS

| 9,856,025 B2 | 1/2018 | Jasny et al. |
| 11,130,577 B2 | 9/2021 | Carlioz et al. |

(Continued)

FOREIGN PATENT DOCUMENTS

| DE | 102005035752 A1 | 2/2007 |
| EP | 3594122 A1 | 1/2020 |

(Continued)

OTHER PUBLICATIONS

Office Action dated Jul. 5, 2022 issued for corresponding German Patent Application No. 102021117964.5 (and English translation).

(Continued)

*Primary Examiner* — Tye William Abell
(74) *Attorney, Agent, or Firm* — Posz Law Group, PLC

(57) ABSTRACT

An aircraft seat arrangement includes a first aircraft seat device and a second aircraft seat device. The second aircraft seat device has an enclosure which forms a backrest wall in a subregion of the enclosure of the second aircraft seat device. The second aircraft seat device includes in an aircraft seat region a seat bottom which has a seat bottom front edge, a main extension axis of the seat bottom front edge being oriented at an angle of at least 5 degrees with respect to an aircraft seat device transversal axis of the second aircraft seat device. A lying-down direction of the aircraft seat region is oriented at an angle of at least 30 degrees with (Continued)

Figure 1:
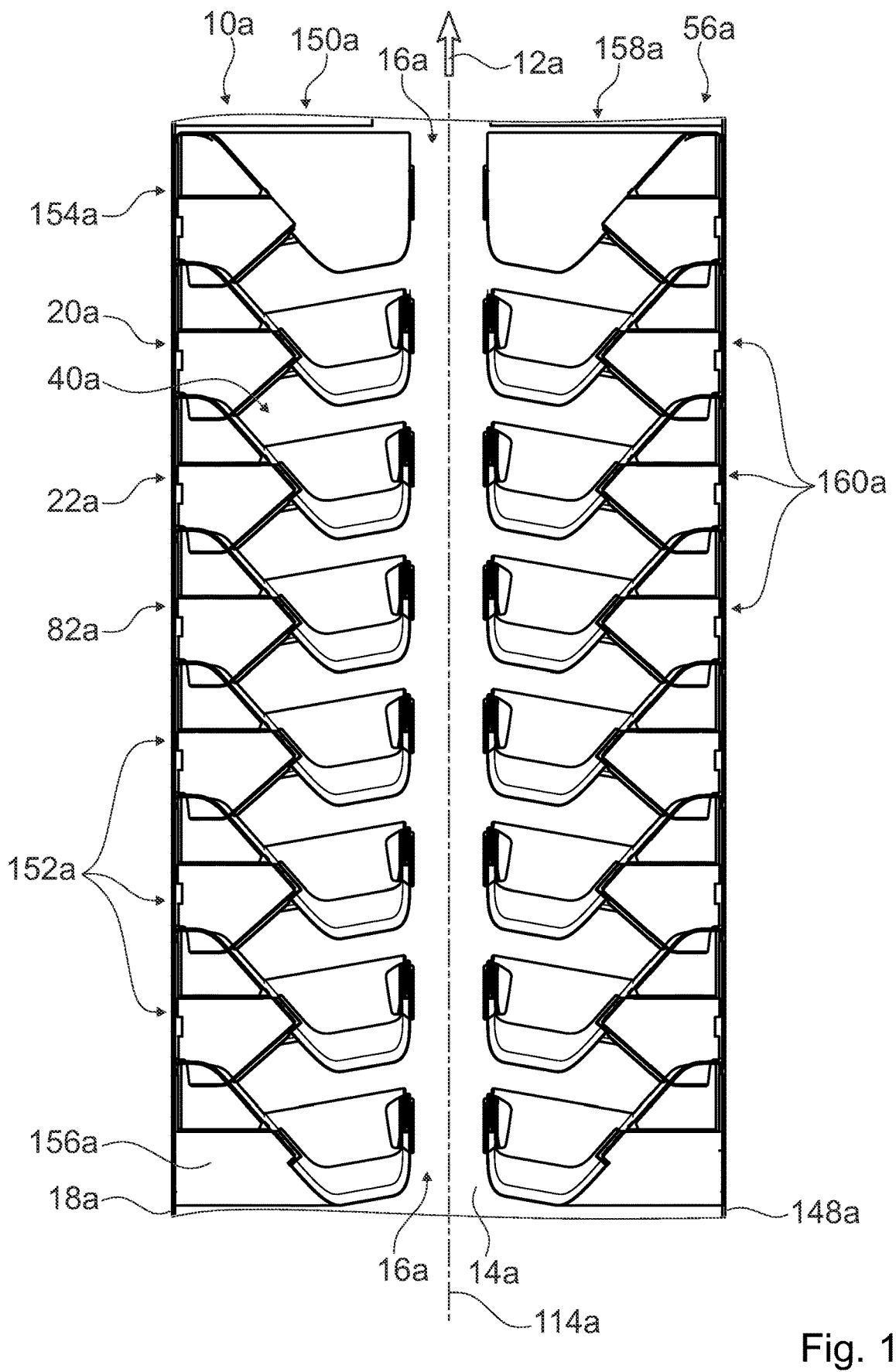

respect to an aircraft seat device longitudinal axis of the second aircraft seat device, the lying-down direction being directed away from an access region of the aircraft seat region.

20 Claims, 12 Drawing Sheets

(56) References Cited

U.S. PATENT DOCUMENTS

| | | |
|---|---|---|
| 2009/0243352 A1 | 10/2009 | Cailleteau |
| 2011/0253838 A1* | 10/2011 | Bettell ............... B64D 11/0606 244/118.6 |
| 2013/0106156 A1* | 5/2013 | Orson ................ B64D 11/0641 297/217.3 |
| 2014/0210235 A1 | 7/2014 | Ferry et al. |
| 2015/0298812 A1* | 10/2015 | Jasny .................... B64D 11/06 297/344.21 |
| 2015/0360783 A1 | 12/2015 | Cailleteau et al. |
| 2016/0083093 A1 | 3/2016 | Tighe et al. |
| 2016/0332734 A1* | 11/2016 | Goode ............. B64D 11/06395 |
| 2021/0114732 A1* | 4/2021 | Williams ........... B64D 11/0641 |

FOREIGN PATENT DOCUMENTS

| | | |
|---|---|---|
| FR | 3004419 A1 | 10/2014 |
| GB | 2438162 A | 11/2007 |
| GB | 2500258 A | 9/2013 |
| GB | 2586273 A | 2/2021 |
| WO | 2018/151779 A1 | 8/2018 |

OTHER PUBLICATIONS

International Preliminary Report on Patentability of the International Search Authority mailed Jan. 16, 2024 and Written Opinion of the International Searching Authority mailed Oct. 17, 2022 in the corresponding International Application No. PCT/EP2022/069489.
International Search Report of the International Searching Authority mailed Oct. 17, 2022 for corresponding International Application No. PCT/EP2022/069489 (and English translation).
Office Action mailed Apr. 24, 2025 in corresponding European Patent Application No. 22744743.0 (and English translation).

* cited by examiner

AIRCRAFT-SEAT ASSEMBLY

CROSS-REFERENCE TO RELATED APPLICATIONS

This patent application is a U.S. national stage application of international patent application PCT/EP2022/069489, filed on Jul. 12, 2022, which is based on and claims priority of German patent application DE 10 2021 117 964.5, filed on Jul. 12, 2021, the contents of which are incorporated herein by reference.

PRIOR ART

The invention relates to an aircraft seat arrangement.

An aircraft seat arrangement with a first aircraft seat device and with a second aircraft seat device, which is arranged directly behind the first aircraft seat device and is realized at least substantially identically to the first aircraft seat device, has already been proposed.

The objective of the invention is in particular to provide a generic device with improved properties with regard to construction space efficiency and comfort. The objective is achieved according to the invention.

Advantages of the Invention

According to the invention, an aircraft seat arrangement with a first aircraft seat device and with a second aircraft seat device, which is arranged directly behind the first aircraft seat device and is realized at least substantially identically to the first aircraft seat device, is proposed, wherein the first aircraft seat device has an enclosure and the second aircraft seat device has an enclosure which forms a backrest wall at least in a subregion of the enclosure of the second aircraft seat device, wherein the first aircraft seat device and the second aircraft seat device together form an aircraft seat region for a passenger, which is arranged at least substantially between the enclosure of the first aircraft seat device and the enclosure of the second aircraft seat device, wherein the second aircraft seat device comprises in the aircraft seat region a seat bottom having a seat bottom front edge, a main extension axis of the seat bottom front edge being oriented at an angle of at least 5 degrees to an aircraft seat device transversal axis of the second aircraft seat device, wherein the first aircraft seat device comprises in the aircraft seat region an ottoman which in a lying-down position of the aircraft seat region together with the seat bottom of the second aircraft seat device forms at least a portion of a lying-down surface of the aircraft seat region, wherein a lying-down direction of the aircraft seat region is oriented at an angle of at least 30 degrees with respect to an aircraft seat device longitudinal axis of the second aircraft seat device, the lying-down direction being directed away from an access region of the aircraft seat region. Such an implementation according to the invention allows providing an advantageously construction space-efficient aircraft seat arrangement. In particular, an advantageously compact arrangement of aircraft seat devices is achievable by the implementation according to the invention. This allows advantageously efficient utilization of an available construction space in an aircraft cabin. Furthermore, an advantageously comfortable aircraft seat arrangement can be provided by the implementation according to the invention. Herein the implementation according to the invention allows providing an advantageously comfortable backrest wall, which permits the passenger to assume different sitting positions.

The aircraft seat arrangement is preferably configured to be used in an aircraft cabin of an aircraft. The aircraft cabin preferably has an aircraft cabin floor, which forms a mounting plane. The first aircraft seat device and the second aircraft seat device are preferably configured to be mounted in the aircraft cabin on the mounting plane. "Configured" is preferably to mean specifically designed and/or equipped. By an object being configured for a certain function is preferably to be understood that the object fulfils and/or carries out this certain function in at least one application state and/or operation state. The aircraft cabin preferably comprises at least one aircraft cabin aisle. The at least one aircraft cabin aisle preferably extends at least substantially along an axis that is oriented parallel to an aircraft cabin longitudinal axis of the aircraft cabin. The aircraft cabin preferably comprises at least one aircraft cabin wall. The first aircraft seat device and the second aircraft seat device preferably each extend at least substantially over an entire space between the aircraft cabin aisle and the aircraft cabin wall. "At least substantially" is preferably to mean that a deviation from a given value is in particular less than 25%, preferably less than 10% and particularly preferably less than 5% of the given value.

That "the second aircraft seat device is arranged directly behind the first aircraft seat device" is preferably to mean that the second aircraft seat device directly follows the first aircraft seat device and in particular no further aircraft seat device and/or no cabin element is arranged between the first aircraft seat device and the second aircraft seat device.

By an "aircraft seat region" is preferably a region to be understood that is intended for the, in particular sitting and lying-down, stay of the passenger during a flight. The aircraft seat region preferably extends over a subregion of the first aircraft seat device and also over a subregion of the second aircraft seat device, in particular when viewed orthogonally to a plane parallel to the mounting plane. By an "access region" is preferably a region to be understood that offers an, in particular barrier-free, access from the aircraft cabin aisle to the aircraft seat region. The first aircraft seat device and the second aircraft seat device preferably each have a direct access to the same aircraft cabin aisle. Preferentially the direct accesses of the first aircraft seat device and of the second aircraft seat device are independent from each other.

The seat bottom of the second aircraft seat device is preferably arranged on an aisle side. "Arranged on an aisle side" is preferably to mean that in the sitting position, viewed along the aircraft seat device longitudinal axis, at least a large portion of the seat bottom is arranged on a region of the second aircraft seat device that faces towards the access region, in particular towards the aircraft cabin aisle.

A "subregion of the enclosure" is preferably to mean a region that directly adjoins the seat bottom of the second aircraft seat device and extends at least from the seat bottom of the second aircraft seat device towards an upper edge of the enclosure of the second aircraft seat device. The second aircraft seat device comprises the backrest wall. Preferably the backrest wall is preferably configured such that the passenger can support himself on the backrest wall in different postures. The backrest wall of the second aircraft seat device is preferably realized integrally with the enclosure of the second aircraft seat device. In principle, however, it would also be conceivable that the second aircraft seat device has a structure by means of which the backrest wall of the second aircraft seat device is connected to the enclosure of the second aircraft seat device. The backrest wall of the second aircraft seat device preferably comprises at least one cushion, or the backrest wall of the second aircraft seat device is realized at least partially as a cushion. The at least one cushion preferably forms a support surface. On a front side of the backrest wall that faces towards the aircraft seat region, the backrest wall of the second aircraft seat device preferably has an inclination that forms an angle between 90 degrees and 120 degrees with respect to the mounting plane. The backrest wall preferably has an upper region and a lower region. Preferably, the upper region of the backrest wall, in particular in the case of a passenger corresponding at least to a median percentile, is configured to support the passenger's head. In principle, the upper region of the backrest wall may also be configured to support a nape and/or an, in particular upper, region of a shoulder of the passenger, in particular if the passenger corresponds to a large percentile. The upper region of the backrest wall preferably forms a headrest. The lower region of the backrest wall is preferably configured to support a back and/or a shoulder of the passenger. Preferably the upper region of the backrest wall is arranged in an upper third, particularly preferably in an upper quarter, of an extent between the seat bottom of the second aircraft seat device and an upper edge of the enclosure of the second aircraft seat device. The upper region of the backrest wall is preferably arranged in an immobile fashion, in particular immobile relative to the enclosure of the second aircraft seat device and/or to a mounting unit of the second aircraft seat device. Particularly preferably, the upper region of the backrest wall is realized so as to be permanently fixed, in particular independently from the TTL position and/or the lying-down position of the aircraft seat region. The lower region of the backrest wall is preferably arranged in two lower thirds, particularly preferably in a lower half, of an extent between the seat bottom of the second aircraft seat device and an upper edge of the enclosure of the second aircraft seat device. The lower region of the backrest wall preferably forms a backrest. In principle, the lower region of the backrest wall may also be realized as a lumbar region. The lower region of the backrest wall is preferably arranged, in particular directly, below the upper region of the backrest wall. Preferentially the lower region of the backrest wall is arranged between the seat bottom of the second aircraft seat device and the upper region of the backrest wall. The backrest wall is preferably realized so as to be at least partially immobile, in particular not pivotable, in particular in the upper region of the backrest wall. Preferably the entire backrest wall is not completely pivotable. In the lying-down position of the aircraft seat region, the backrest wall preferably does not form a portion of the lying-down surface. The passenger is preferably provided with at least one pillow, which is preferably utilizable to compensate for unevenness which is in particular caused by an adjustment of the backrest wall.

The seat bottom is preferably transferable from a TTL position of the aircraft seat region into the lying-down position of the aircraft seat region. In the lying-down position the seat bottom, in particular a seat surface of the seat bottom, is preferably inclined by an angle of 3 degrees with respect to the mounting plane.

Preferentially, at a front end of the seat bottom a seat bottom front edge is formed, which faces towards the ottoman of the first aircraft seat device and/or towards the enclosure of the first aircraft seat device. The seat bottom front edge is preferably realized at least substantially as a straight line. Alternatively or additionally, the seat bottom front edge may also contain several sections, wherein at least one of the sections is realized at least substantially as a straight line. In principle, it is also conceivable that the seat bottom front edge is formed at least substantially from at least two straight lines which are angled to each other. In principle, the seat bottom front edge may have respectively one radius at its lateral ends. The main extension axis of the seat bottom front edge is preferably oriented at an angle of at most 18 degrees with respect to the aircraft seat device transversal axis of the second aircraft seat device. A "main extension axis" of an object is preferably to mean an axis which runs parallel to a longest edge of a smallest imaginary geometric cuboid just still completely enclosing the object.

A sitting direction of the aircraft seat region, which is assumed by the passenger in a TTL position of the aircraft seat region in a TTL phase, is preferably directed away from the access region of the aircraft seat region. A "TTL position" is preferably to mean a configuration of the aircraft seat region in which the passenger sits substantially upright on the seat bottom but cannot lie in the aircraft seat region. A "TTL phase" is preferably to mean a state during operation of the aircraft in which the passenger has to assume a defined sitting position on the seat bottom for safety reasons, in particular in a taxiing phase, in a takeoff phase and in a landing phase of the aircraft. The sitting direction assumed by the passenger in the TTL position of the aircraft seat region in the TTL phase is preferably oriented orthogonally with respect to the main extension axis of the seat bottom front edge of the seat bottom of the second aircraft seat device. Preferably, differing from the sitting direction assumed by the passenger in the TTL position of the aircraft seat region in the TTL phase, further sitting directions are possible which can be assumed by the passenger in the TTL position in a cruise flight phase. A "cruise flight phase" is preferably to mean a state during operation of the aircraft in which the passenger can freely select his position in the aircraft seat region. A directional component of the sitting direction of the aircraft seat region, assumed by the passenger in the TTL position of the aircraft seat region in the TTL phase, preferably points in flight direction. In principle, however, the directional component of the sitting direction may also be oriented opposed to the flight direction. A "flight direction" is preferably to mean a direction in which the aircraft cabin is, in particular translationally, moved during a flight. The flight direction preferably extends from a tail of the aircraft towards a nose of the aircraft.

A "lying-down position of the aircraft seat region" is preferably to mean an implementation of the aircraft seat region in which units and/or elements are oriented and/or adjusted such that there a continuous lying-down surface on which the passenger can lie. A "lying-down surface of the aircraft seat region" is preferably to mean a surface on which the passenger can extend and lie, in particular with his entire body. The lying-down surface preferably forms a lying-down plane of the aircraft seat region. Preferentially the passenger can assume a sleeping position on the lying-down surface. The lying-down surface of the aircraft seat region is preferably arranged at least substantially in a plane that is in particular inclined by an angle of 3 degrees with respect to the mounting plane. The lying-down surface of the aircraft seat region is preferably arranged between the enclosure of the first aircraft seat device and the enclosure of the second aircraft seat device. The lying-down surface is preferably equivalent at least to a large portion of an entire surface extending between the enclosure of the first aircraft seat device and the enclosure of the second aircraft seat device and also between the aircraft cabin wall and the aircraft cabin aisle, in particular when viewed orthogonally to a plane parallel to the mounting plane. "At least a large portion" is preferably to mean at least 55%, preferentially at least 65% and particularly preferentially at least 75%.

A "lying-down direction" is preferably to mean a direction which, in particular in the lying-down position of the aircraft seat region, runs at least substantially parallel to the mounting plane, preferably with a deviation of 3 degrees with respect to the mounting plane, and along a lying-down axis of the aircraft seat region. The lying-down direction is preferably directed from a head region of the lying-down surface to a foot region of the lying-down surface. Preferentially the head region of the lying-down surface is arranged on the seat bottom of the second aircraft seat device. The head region of the lying-down surface is preferably configured to support the passenger's head. Preferentially the foot region of the lying-down surface is arranged on the ottoman of the first aircraft seat device. The foot region of the lying-down surface is preferably configured to support the passenger's feet. The lying-down direction is preferably arranged coaxially with the lying-down axis. Preferably the lying-down axis of the aircraft seat region is oriented at least substantially parallel to a further subregion of the enclosure of the second aircraft seat device. A "further subregion of the enclosure" is preferably to mean a region of the enclosure of the second aircraft seat device that extends from the seat bottom of the second aircraft seat device as far as the ottoman of the first aircraft seat device. Preferably, in particular viewed in a cross-sectional plane that is at least substantially parallel to the lying-down plane, the enclosure of the second aircraft seat device extends in the further subregion of the enclosure at least substantially along a straight line. The cross-sectional plane preferably intersects with the enclosure of the first aircraft seat device and with the enclosure of the second aircraft seat device, in particular directly above the lying-down plane. "Viewed in a cross-sectional plane" is preferably to mean a view from a direction that is orthogonal to the cross-sectional plane. The lying-down axis of the aircraft seat region is preferably oriented at least substantially parallel to the straight line. Preferentially the cross-sectional plane is arranged at the level of the lying-down surface of the aircraft seat region or above the lying-down surface of the aircraft seat region. The lying-down direction preferably differs from the sitting direction. The lying-down direction of the aircraft seat region preferably includes a larger angle with the aircraft seat device longitudinal axis than the sitting direction of the aircraft seat region which is assumed by the passenger in the TTL position of the aircraft seat region in the TTL phase. The lying-down direction of the aircraft seat region is preferably oriented at an angle of at most 57 degrees with respect to the aircraft seat device longitudinal axis of the second aircraft seat device. Preferably, a directional component of the lying-down direction of the aircraft seat region, assumed by the passenger in the lying-down position of the aircraft seat region, points in flight direction. In principle, however, the directional component of the lying-down direction may also be oriented opposed to the flight direction. In principle, it is also conceivable that the directional component of the lying-down direction is oriented opposed to the directional component of the sitting direction that is assumed by the passenger in the TTL position of the aircraft seat region in the TTL phase.

In principle, between the TTL position and the lying-down position of the aircraft seat region further positions of the aircraft seat region may be provided, which in particular form a combined sitting and lying-down position.

An "aircraft seat device longitudinal axis" is preferably to mean an axis extending along fastening points of the second aircraft seat device which are arranged one behind the other. The fastening points are preferably configured to connect the second aircraft seat device to the aircraft cabin floor. Preferably the fastening points are configured to be coupled with a fastening rail of the aircraft cabin floor. Preferably, the aircraft seat device longitudinal axis is configured, in a mounted state, to be oriented at least substantially parallel to a main extension axis of the fastening rail. Preferably, the aircraft seat device longitudinal axis is in a mounted state oriented at least substantially parallel to the aircraft cabin longitudinal axis of the aircraft cabin. Preferably, the aircraft seat device longitudinal axis is oriented at least substantially parallel to the flight direction. The aircraft seat device longitudinal axis is oriented parallel to the mounting plane. An aircraft seat device transversal axis is oriented orthogonally to the aircraft seat device longitudinal axis. The aircraft seat device transversal axis is oriented parallel to the mounting plane. Preferably, the aircraft seat device transversal axis is oriented at least substantially orthogonally to the aircraft cabin longitudinal axis of the aircraft cabin. Preferably, the aircraft seat device transversal axis is oriented at least substantially orthogonally to fastening rails of the aircraft cabin. Preferably, the aircraft seat device transversal axis is oriented at least substantially parallel to a main extension axis of the second aircraft seat device, in particular when viewed orthogonally to a plane parallel to the mounting plane.

Furthermore, it is proposed that a seat distance between identical reference points of the first aircraft seat device and the second aircraft seat device is at most 97 cm. An advantageously compact aircraft seat arrangement is achievable by this implementation. Preferably the seat distance between identical reference points of the first aircraft seat device and the second aircraft seat device is at most 38 inches. Preferably the seat distance is measured parallel to the aircraft seat device longitudinal axis. Preferably the seat distance between identical reference points of the first aircraft seat device and the second aircraft seat device is at least 30 inches.

Furthermore, it is proposed that the backrest wall of the second aircraft seat device is concavely curved on a side facing towards the aircraft seat region. Such an implementation allows achieving an advantageously comfortable aircraft seat device. Furthermore, an advantageous lateral support for the passenger is enabled. Preferably the seat bottom of the second aircraft seat device together with the backrest wall of the second aircraft seat device forms a niche in which the passenger can stay in a sitting posture.

It is also proposed that the seat bottom of the second aircraft seat device is realized as a seat bench on which the passenger can assume different sitting positions, wherein the seat bottom front edge extends over a length of at least 70 cm. This implementation advantageously allows improving a freedom of movement for the passenger. This allows providing an advantageously comfortable aircraft seat device. The term "different sitting positions" is preferably to mean different sitting postures of the passenger, wherein a position of the passenger's buttocks on the seat bench is freely selectable. For example, during the TTL phase the passenger may assume an upright sitting posture, in which the sitting direction is oriented at least substantially orthogonally to the seat bottom front edge. Alternatively the passenger may assume further, in particular upright, sitting postures on the seat bench, in which in particular the passenger's back may be oriented differently. Herein further sitting directions are conceivable, which differ from the sitting direction assumed by the passenger in the TTL position of the aircraft seat region in the TTL phase. Preferably the passenger can assume the further sitting directions in the cruise flight phase, and in particular not in the TTL phase. Preferably the further sitting directions, which differ from the sitting direction assumed by the passenger in the TTL position of the aircraft seat region in the TTL phase, may be oriented at an angle of up to +/−90 degrees with respect to the sitting direction assumed by the passenger in the TTL position of the aircraft seat region in the TTL phase. The backrest wall of the second aircraft seat device preferably forms a concavely-curved support surface, in particular for the passenger's back. Preferably it is possible for the passenger to lean against different regions of the support surface.

It is further proposed that in the TTL position of the aircraft seat region a free space, which is free of an at least substantially horizontally-extending support surface, is arranged between the enclosure of the second aircraft seat device and the access region of the aircraft seat region. Advantageously great leg clearance is achievable by this implementation. Furthermore, in particular an advantageously wide footwell can be provided in this way. Moreover, for example, luggage can be stored in the free space, at least in the cruise flight phase. Herein it is nevertheless possible to provide an advantageously comfortable footwell. By a "free space" is preferably a volume to be understood that, in particular in the TTL position of the aircraft seat region, is free of obstacles and/or of components of the first aircraft seat device and/or of the second aircraft seat device. The free space preferentially extends at least substantially from the mounting plane to at least one upper edge of the seat bottom of the second aircraft seat device. Preferably, in the TTL position the lying-down surface is interrupted by the free space. An "at least substantially horizontally-extending support surface" is preferably to mean the lying-down surface of the aircraft seat region. In the lying-down position of the aircraft seat region, the lying-down surface of the aircraft seat region preferably at least substantially penetrates and/or bridges the free space.

A maximal lying-down length in the aircraft seat region is preferably at least 198 cm. Such an implementation advantageously allows providing a long bed length. In this way an advantageously comfortable aircraft seat arrangement can be obtained. Preferably the maximal lying-down length in the aircraft seat region is at least 78 inches. Preferably the maximal lying-down length is determined by means of a 9-inch ball method, in which two spaced-apart balls with a 9-inch diameter are used for a measurement of the lying-down length. These balls preferably lie tangentially at lying-down surface boundaries, in particular on the one hand at the backrest wall of the second aircraft seat device and on the other hand at the enclosure of the first aircraft seat device, at a maximally possible distance of the balls from each other. The maximal lying-down length is preferably equivalent to a distance of maximally spaced-apart points of the two balls in the aircraft seat region. The two balls preferentially lie upon the lying-down surface of the aircraft seat region. Preferably the lying-down axis runs parallel to or along a straight line which connects the maximally spaced-apart points of the two balls to each other.

Beyond this it is proposed that an inclination of the seat bottom of the second aircraft seat device can be changed between a TTL position and a lying-down position. Such an implementation allows the seat bottom particularly advantageously forming a portion of the lying-down surface. This allows providing a flat lying-down surface. The seat bottom of the second aircraft seat device is preferably pivotable between the TTL position and the lying-down position by an angle of at least 8 degrees relative to the mounting plane.

Furthermore, it is proposed that the second aircraft seat device comprises at least one movable leg support element, which is coupled with the seat bottom of the second aircraft seat device. This implementation allows providing a portion of the lying-down surface in an advantageously simple manner. Preferably, the at least one leg support element of the second aircraft seat device is realized as a leg support which can be utilized independently from the lying-down position of the aircraft seat region. Preferably, the at least one leg support element of the second aircraft seat device is continuously adjustable. Preferably the at least one leg support element of the second aircraft seat device is configured to form a portion of the lying-down surface, in particular in the lying-down position of the aircraft seat region. In principle, it is conceivable that in the lying-down position of the aircraft seat region the passenger also rests with body parts other than his/her legs on the at least one leg support element of the second aircraft seat device. Preferably, in the lying-down position of the aircraft seat region the passenger lies on the at least one leg support element at least partially with his/her upper body. Preferably, the at least one leg support element of the second aircraft seat device is coupled with the seat bottom of the second aircraft seat device in a pivotable and/or translationally deployable manner. Preferably the at least one leg support element of the second aircraft seat device is supported at the seat bottom of the second aircraft seat device. Preferably the at least one leg support element of the second aircraft seat device is electromechanically, pneumatically and/or hydraulically movable. In principle, however, it would also be conceivable that the at least one leg support element of the second aircraft seat device is movable manually.

Furthermore, it is proposed that the second aircraft seat device comprises at least one movable support element, which is configured to form a portion of the lying-down surface. This implementation allows providing a portion of the lying-down surface in an advantageously simple manner. Preferably the at least one support element of the second aircraft seat device is configured, in the lying-down position of the aircraft seat region, to form a portion of the lying-down surface. Preferably in the lying-down position of the aircraft seat region the passenger lies at least partially with his/her upper body and/or his/her buttocks on the at least one support element of the second aircraft seat device. Preferably the at least one support element of the second aircraft seat device is electromechanically, pneumatically and/or hydraulically movable. In principle, however, it would also be conceivable that the at least one support element of the second aircraft seat device is movable manually. Preferably the at least one support element of the second aircraft seat device is coupled with the seat bottom and/or with the mounting unit of the second aircraft seat device in a deployable and/or pivotable manner.

Alternatively, the at least one support element may be supported movably on the at least one leg support element of the second aircraft seat device. Preferably, the at least one support element of the second aircraft seat device is supported such that it is deployable and/or extractable with respect to the leg support element of the second aircraft seat device. Preferably, in at least one operation state the at least one support element of the second aircraft seat device is integrated in the at least one leg support element.

In principle, the at least one support element of the second aircraft seat device may be supported movably on the enclosure of the second aircraft seat device and/or on an ottoman of the second aircraft seat device. Preferably, the at least one support element of the second aircraft seat device is supported in a deployable, extractable, pivotable and/or foldable manner in and/or on the enclosure of the second aircraft seat device and/or in the ottoman of the second aircraft seat device.

It is further proposed that the first aircraft seat device comprises at least one movable support element, which is configured to form a portion of the lying-down surface. Such an implementation allows providing a portion of the lying-down surface in an advantageously simple manner. Preferably the at least one support element of the first aircraft seat device is configured, in the lying-down position of the aircraft seat region, to form a portion of the lying-down surface. Preferably, in the lying-down position of the aircraft seat region the passenger lies upon the at least one support element of the first aircraft seat device at least partially with his/her upper body and/or his/her buttocks. Preferably the at least one support element of the first aircraft seat device is electromechanically, pneumatically and/or hydraulically movable. In principle, however, it would also be conceivable that the at least one support element of the first aircraft seat device is movable manually.

Furthermore, it is proposed that the at least one support element is supported movably on the ottoman of the first aircraft seat device and/or on the enclosure of the first aircraft seat device. This implementation allows providing a portion of the lying-down surface in an advantageously simple manner. Preferably the at least one support element of the first aircraft seat device is supported in a deployable, extractable, pivotable and/or foldable manner in and/or on the enclosure of the first aircraft seat device, and/or in and/or on the ottoman of the first aircraft seat device.

Beyond this, it is proposed that in the lying-down position of the aircraft seat region the at least one leg support element and the at least one support element are arranged directly side by side and form the lying-down surface of the aircraft seat region together with the seat bottom of the second aircraft seat device and the ottoman of the first aircraft seat device. This implementation allows providing an advantageously continuous lying-down surface. Moreover, this allows providing an advantageously large lying-down surface. "Arranged directly side by side" is preferably to mean that in the lying-down position of the aircraft seat region the at least one leg support element and the at least one support element are spaced apart from each other in particular by at most 3 cm, preferentially by at most 1 cm and particularly preferentially by at most 0.5 cm, in particular when viewed orthogonally to a plane parallel to the mounting plane. Particularly preferentially the at least one leg support element and the at least one support element contact each other in the lying-down position of the aircraft seat region. Preferably the at least one leg support element and the at least one support element are configured to mutually support each other in the lying-down position of the aircraft seat region. Preferably the lying-down surface of the aircraft seat region extends at least substantially completely over the seat bottom of the second aircraft seat device, the at least one leg support element of the second aircraft seat device, the at least one support element of the first and/or second aircraft seat device and the ottoman of the first aircraft seat device.

It is also proposed that the at least one leg support element and/or the at least one support element comprise/s at least one functional element, which in the lying-down position of the aircraft seat region is arranged between the enclosure of the first aircraft seat device and the seat bottom of the second aircraft seat device, and which can be utilized by the passenger in the lying-down position of the aircraft seat region. Such an implementation allows providing an advantageously comfortable aircraft seat device. As a result, even in the lying-down position, in particular when the passenger is lying on the lying-down surface, the passenger can reach functional elements in an advantageously simple manner and/or he can use them when lying down. By "utilizable in the lying-down position of the aircraft seat region" is preferably to be understood that the at least one functional element is arranged at a grasping distance of the passenger, wherein the passenger need not change his/her lying-down position substantially in order to utilize the at least one functional element. The at least one functional element is preferably realized as a beverage holder, as a PED holder (personal electronic device holder) and/or as a book support. Alternatively, the at least one functional element could also be realized as a plug socket. Preferably the at least one functional element is integrated in the at least one leg support element and/or in the at least one support element. Preferably the at least one functional element is spaced apart from the lying-down surface by at most 10 cm, in particular measured orthogonally to the lying-down surface. In principle, it would also be conceivable that the enclosure of the first aircraft seat device or the enclosure of the second aircraft seat device comprises the at least one functional element. It would herein be conceivable in principle that the at least one functional element is unfolded or deployed from the enclosure of the first aircraft seat device or from the enclosure of the second aircraft seat device.

In addition, it is proposed that the second aircraft seat device comprises an armrest unit, which is arranged on an aisle side and is realized so as to be height-adjustable, in particular so as to be lowerable below an upper edge of the seat bottom of the second aircraft seat device. Such an implementation allows enabling an advantageously comfortable access to the aircraft seat region. The armrest unit is preferably traversable towards the mounting plane below and beyond a normal position. In at least one operation state, the armrest unit is preferably realized as a privacy element. The armrest unit is preferably traversable beyond the normal position, away from the mounting plane. The armrest unit is herein preferably arranged in the access region of the aircraft seat region. In principle, it would also be conceivable that the armrest unit comprises a flap element, which is unfoldable upwards above an armrest of the armrest unit.

Furthermore, it is proposed that the backrest wall of the second aircraft seat device is adjustable in its orientation and/or shape at least in a subregion, in particular in the lower region, of the backrest wall. As a result of such an implementation, the backrest wall can be realized in an advantageously comfortable manner, without the backrest wall being overall pivotable. The at least one subregion is preferably comprised by the backrest wall. A "subregion of the backrest wall" is preferably to mean a region of the backrest wall that does not extend over an entire height extent between the seat bottom and the upper edge of the enclosure. Preferably the subregion does not extend over an entire transversal extent of the backrest wall parallel to the aircraft seat device transversal axis. The backrest wall of the second aircraft seat device can preferably be articulated at least in the subregion. Preferably the backrest wall is in the lower region, at least in the subregion of the backrest wall, embodied as an adjustable lumbar support. Herein the backrest wall is preferably adjustable in shape in the lower region of the backrest wall, in particular on a front side of the backrest wall, which faces towards the aircraft seat region. In principle, it would be conceivable that the backrest wall is movable in the at least one subregion, in particular simultaneously and/or independently, into a plurality of orientations and/or positions. Herein the backrest wall is preferably pivotable, for example around at least two axes which are oriented differently to each other. As a result, the backrest wall could be adjusted in the at least one subregion, for example into a recline position and additionally at an angle with respect to the sitting direction that differs from 90 degrees. This enables an advantageously variable adjustment possibility of the backrest wall for increasing comfort. In principle, however, it would also be conceivable that the backrest wall is realized so as to be completely immobile.

The aircraft seat arrangement according to the invention and the aircraft seat device according to the invention shall here not be limited to the above-described application and implementation. In particular, in order to fulfil a functionality that is described here, the aircraft seat arrangement according to the invention and the aircraft seat device according to the invention may have a number of individual elements, components and units that differs from a number mentioned given here.

DRAWINGS

Further advantages will become apparent from the following description of the drawings. Five exemplary embodiments of the invention are illustrated in the drawings. The drawings, the description and the claims contain a plurality of features in combination. Someone skilled in the art will purposefully also consider the features individually and will find further expedient combinations.

Figure 2:
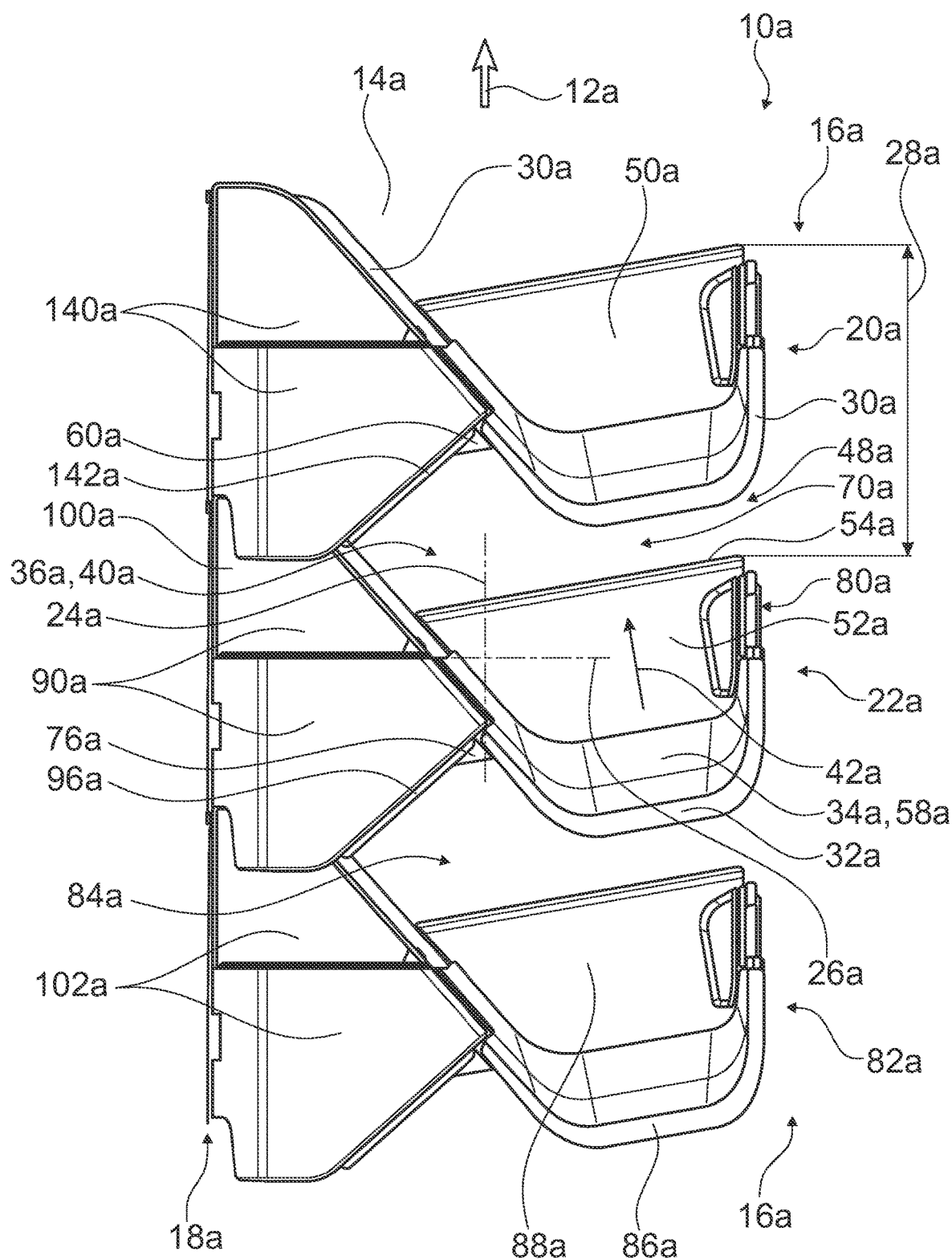
Figure 3:
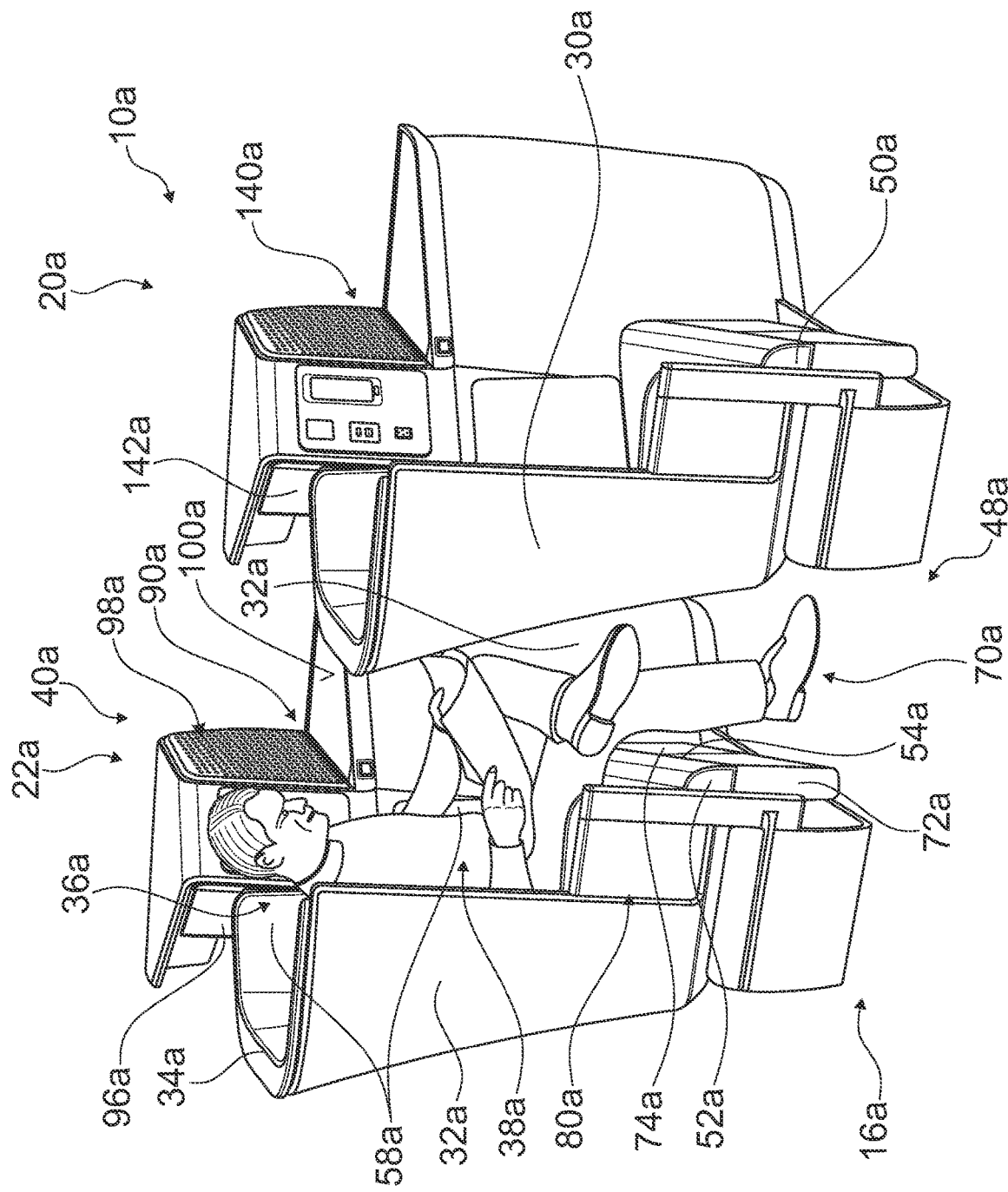
Figure 4:
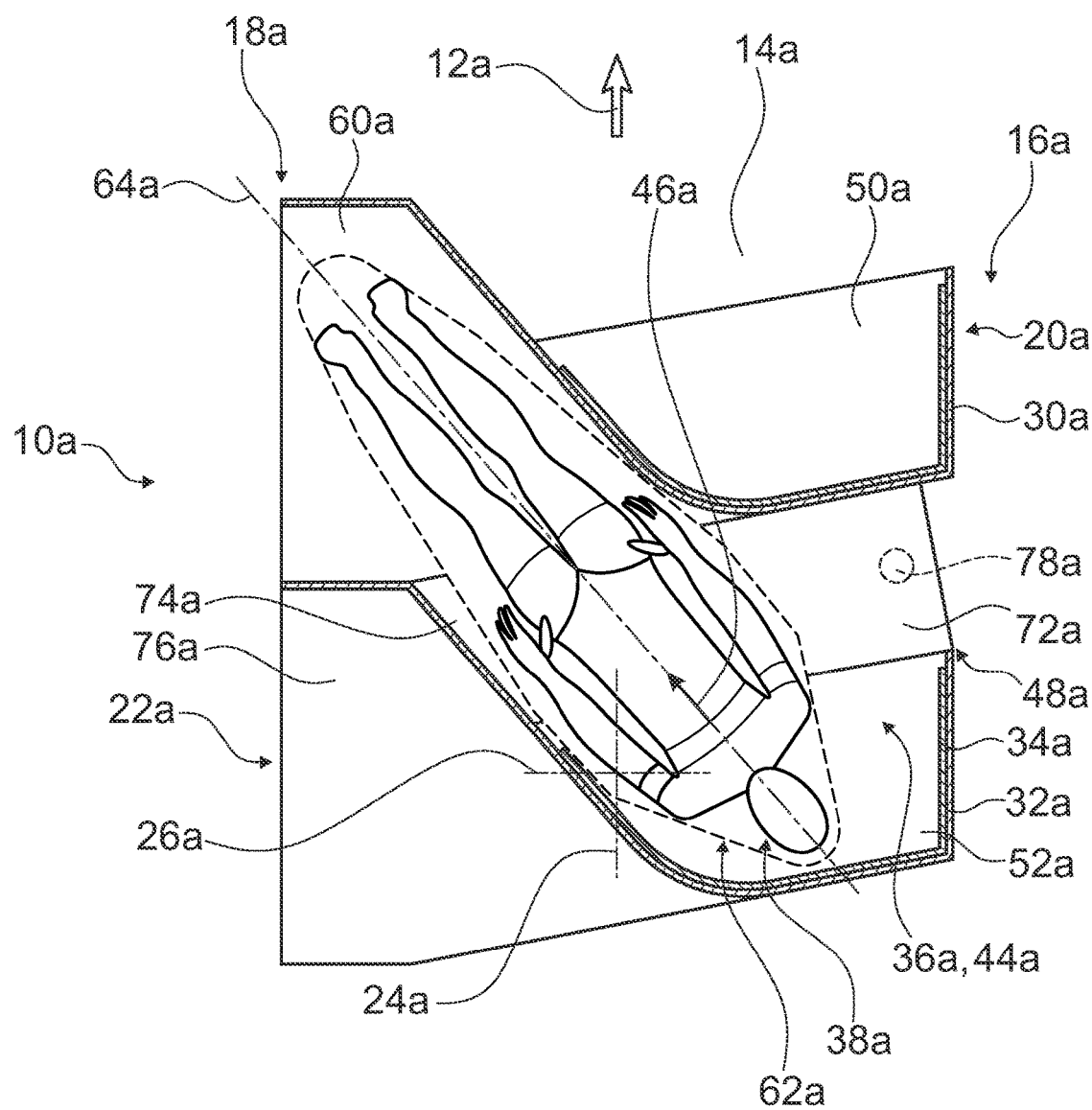
Figure 5:
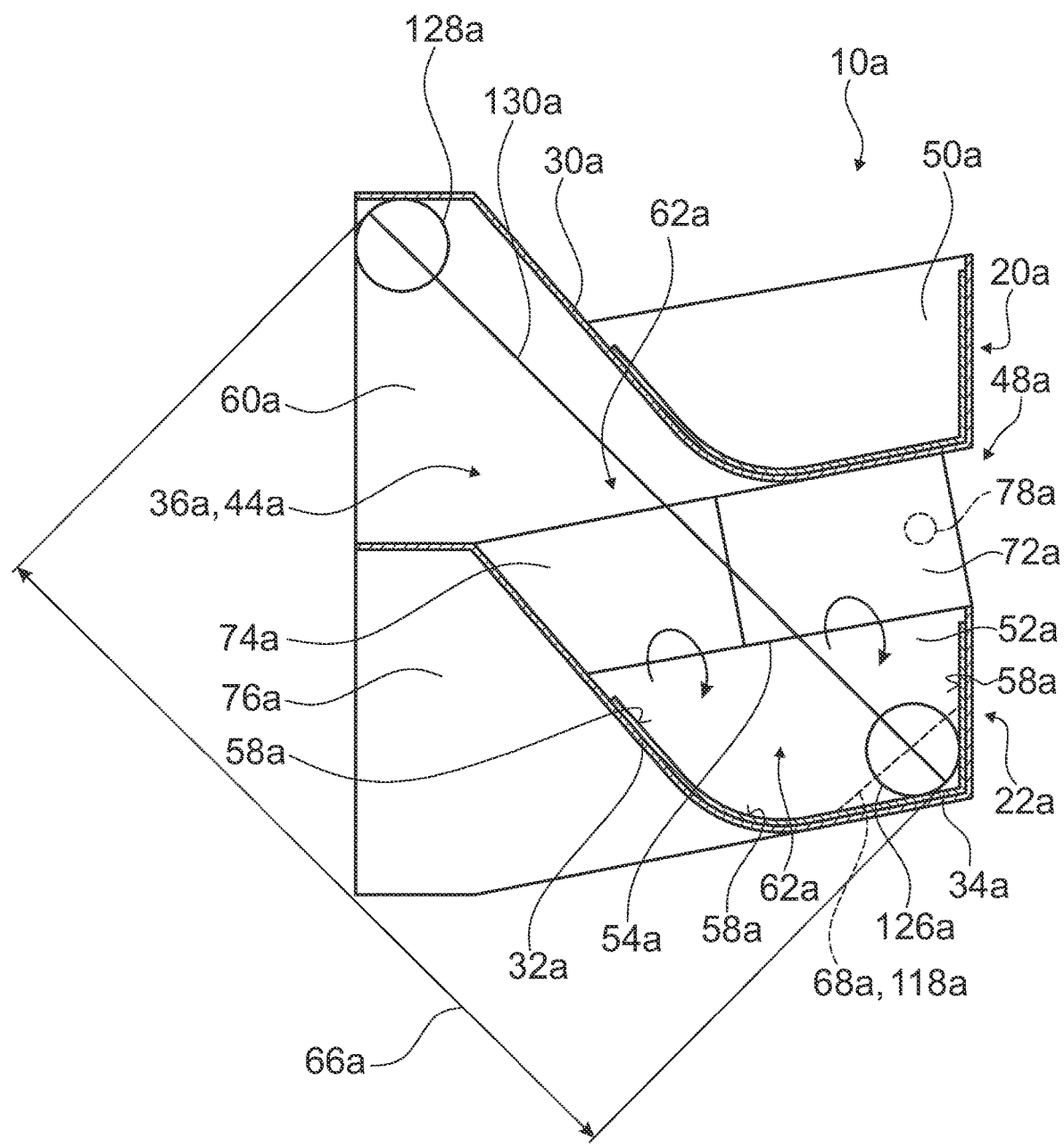
Figure 6:
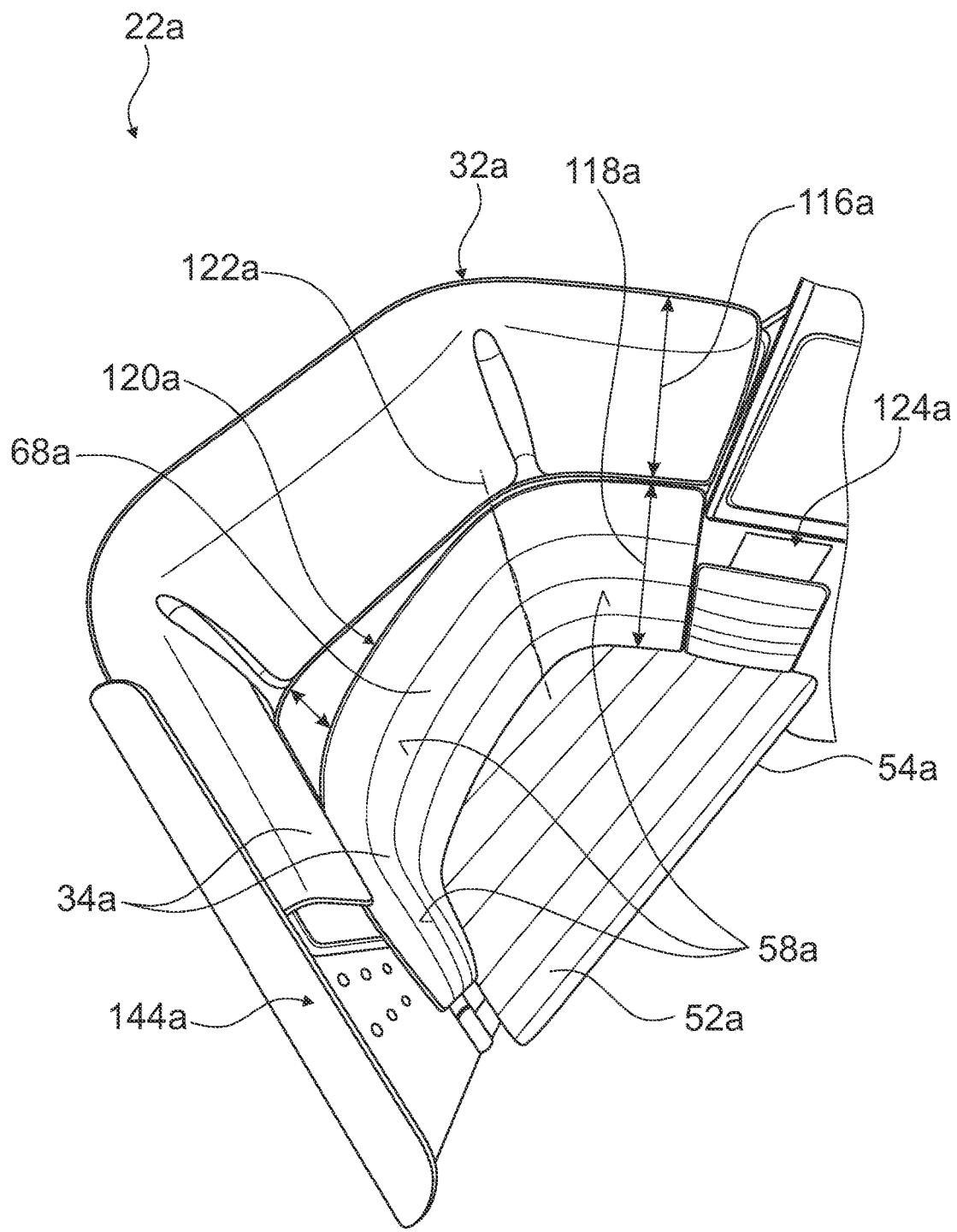
Figure 7:
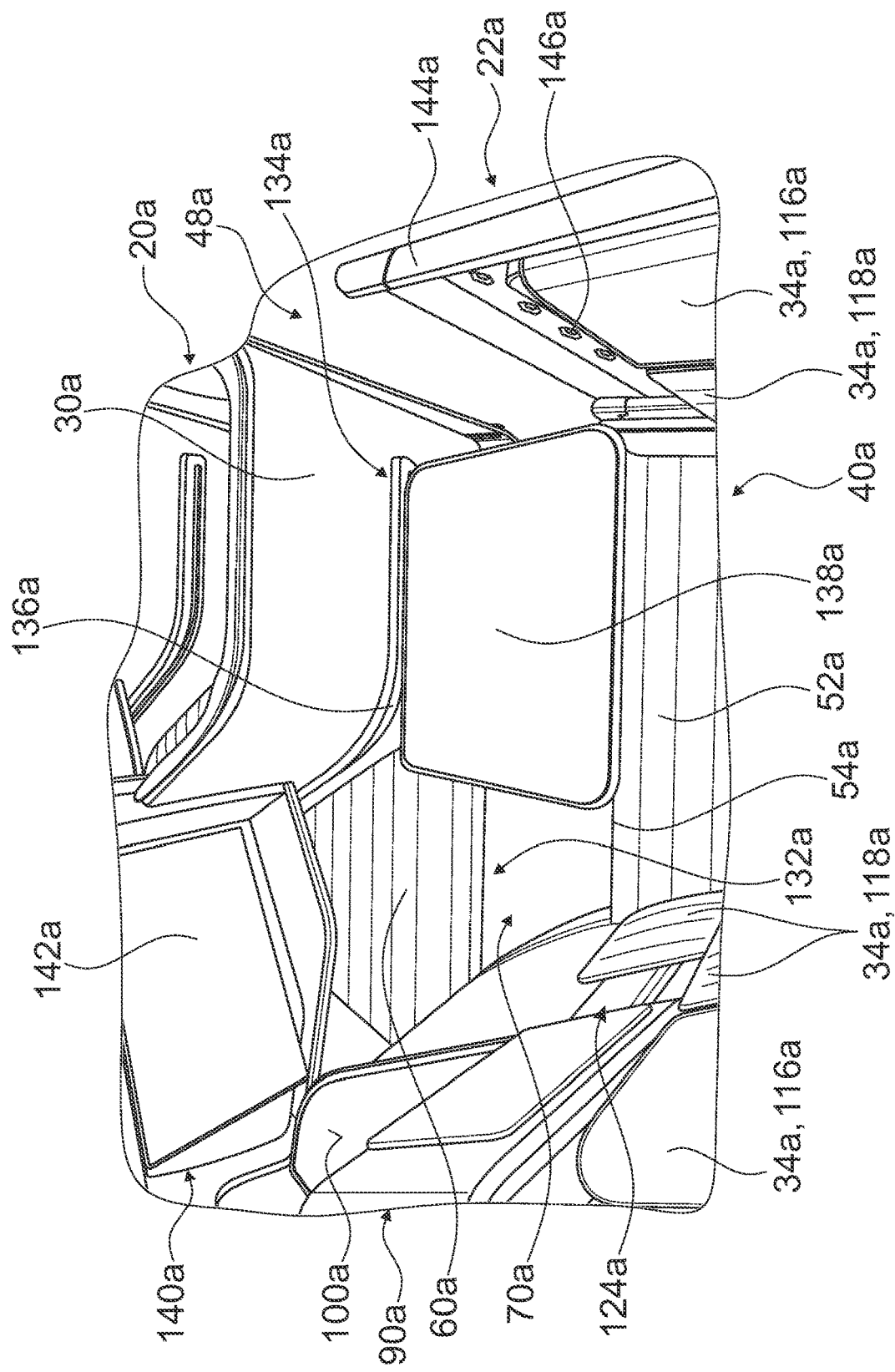
Figure 8:
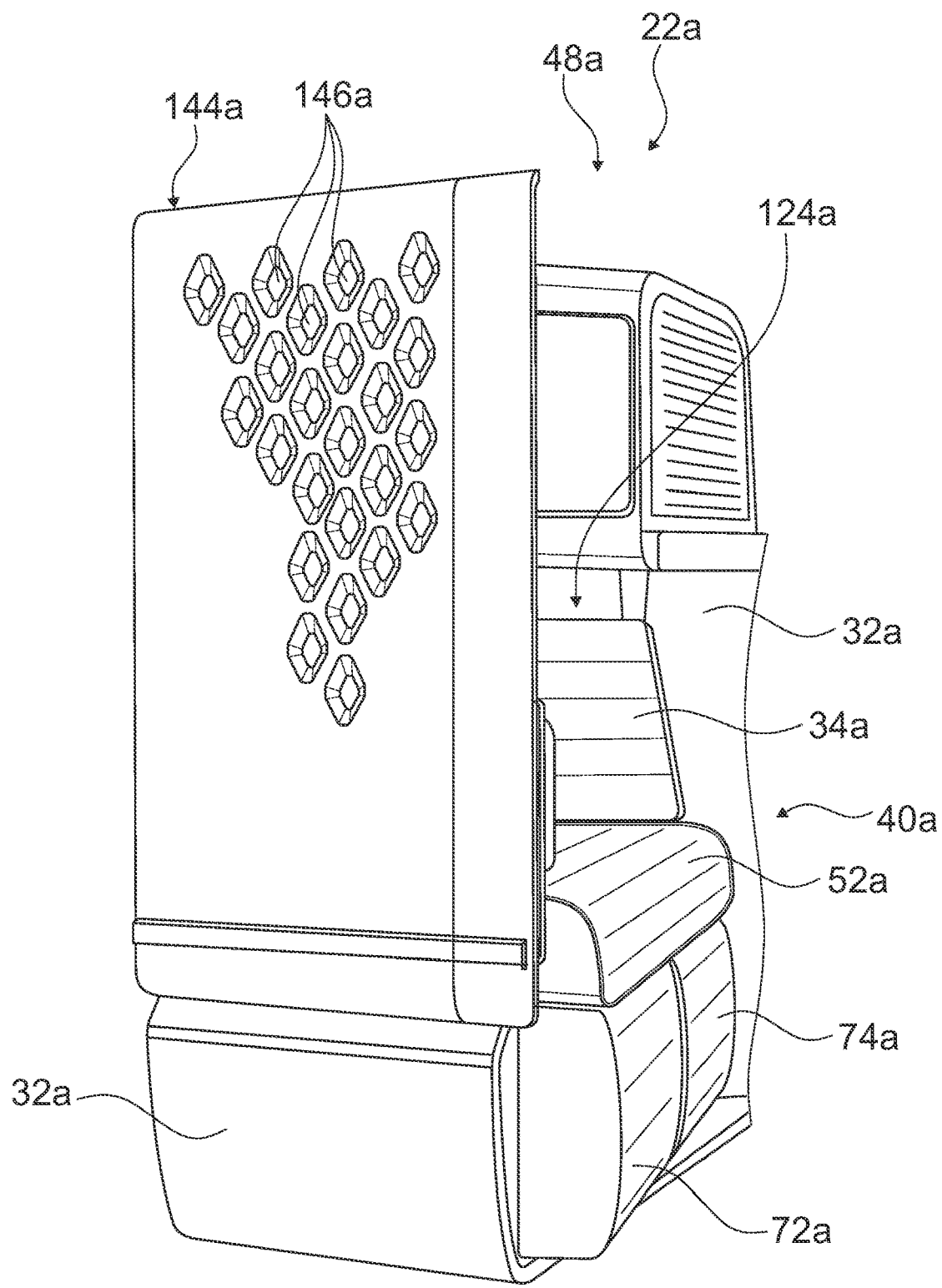
Figure 9:
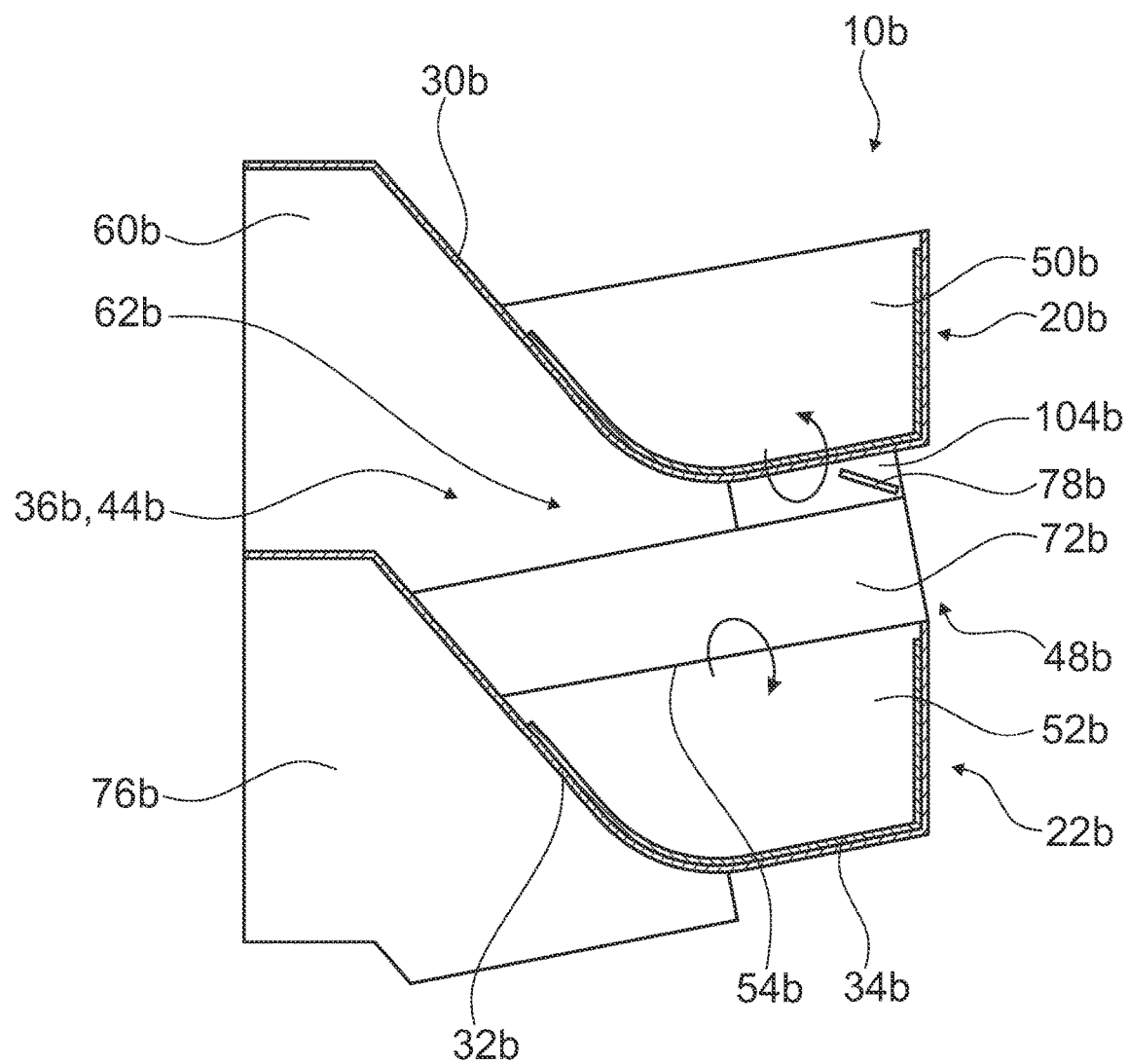
Figure 10:
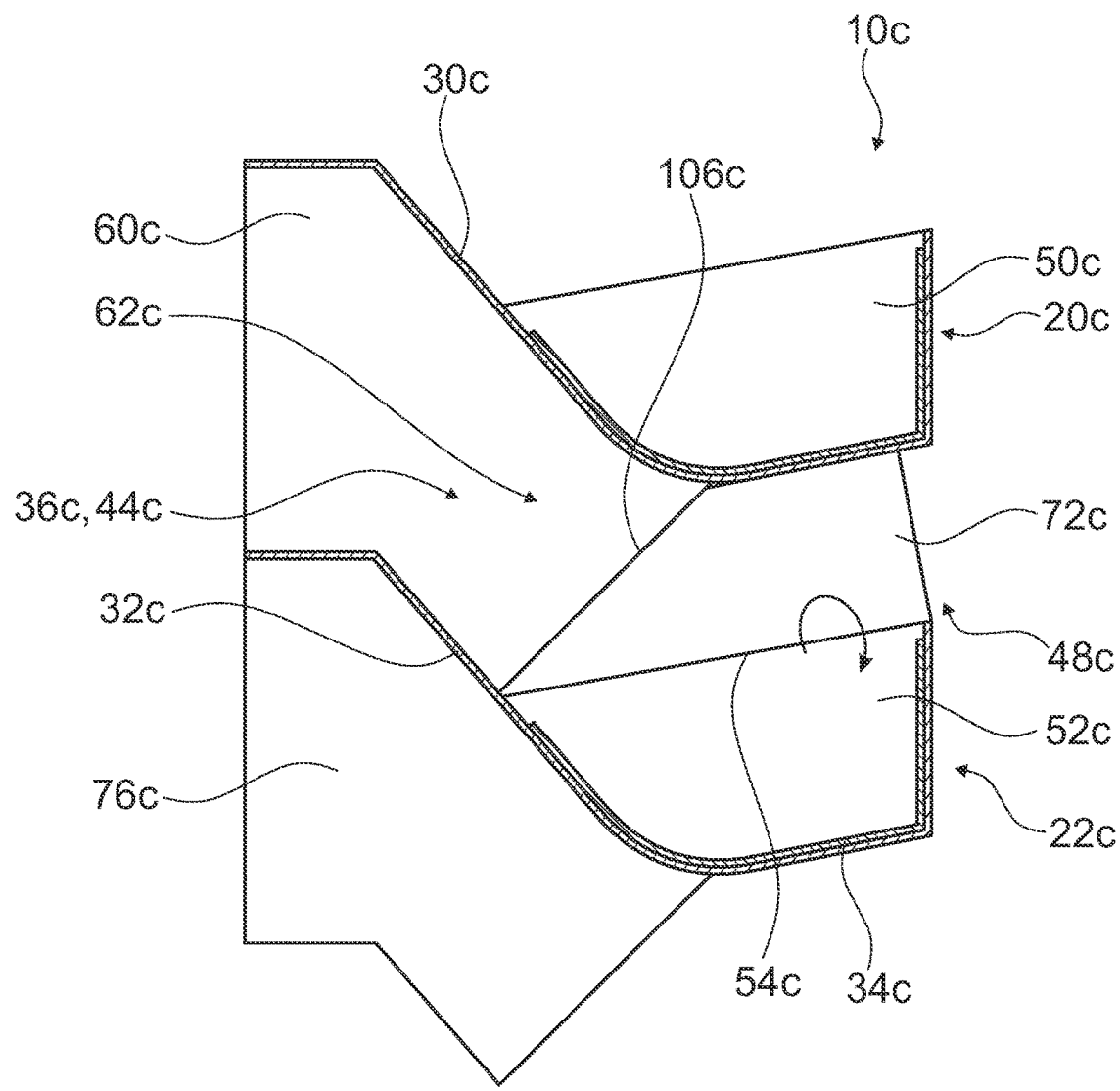
Figure 11:
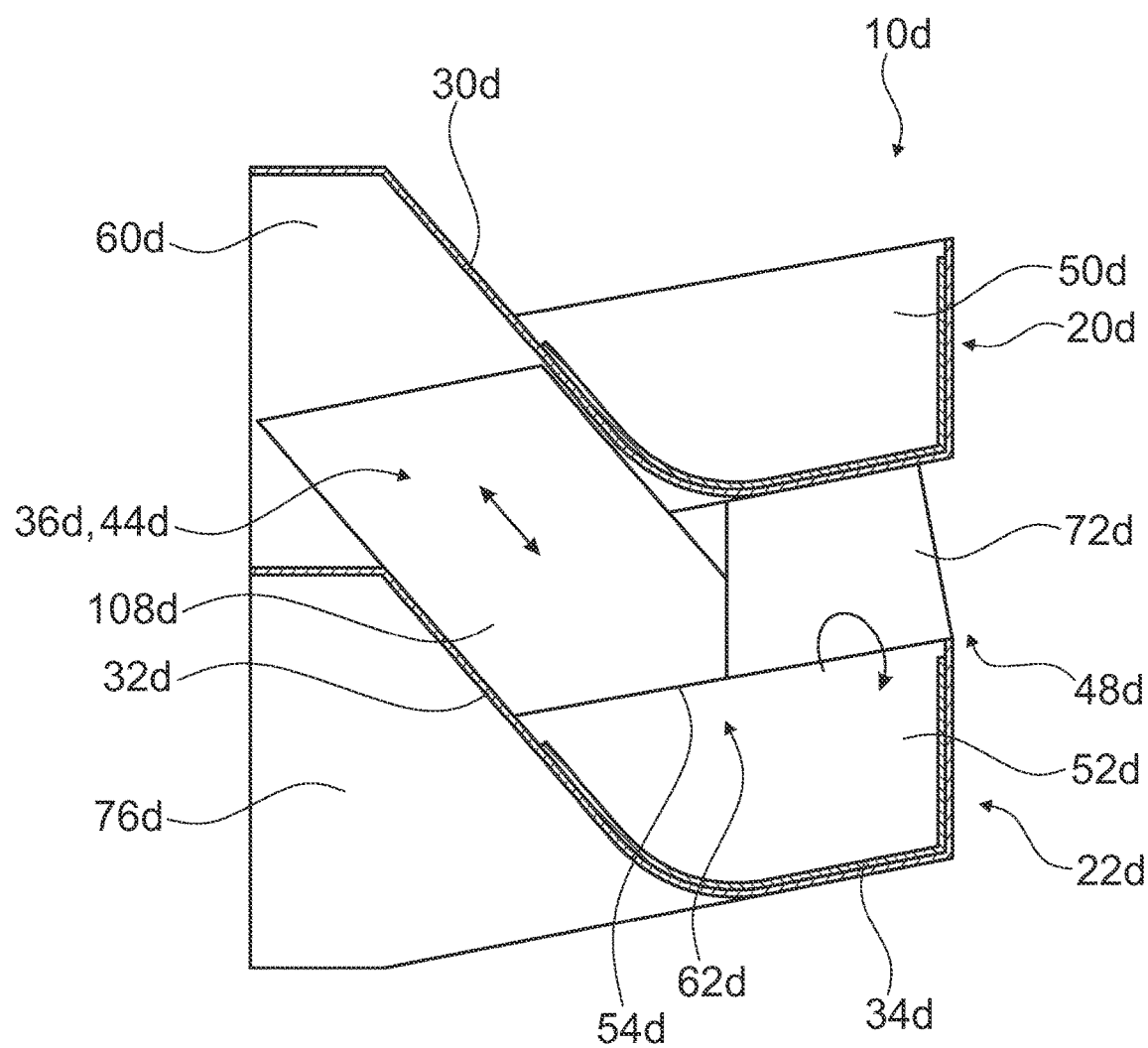
Figure 12:
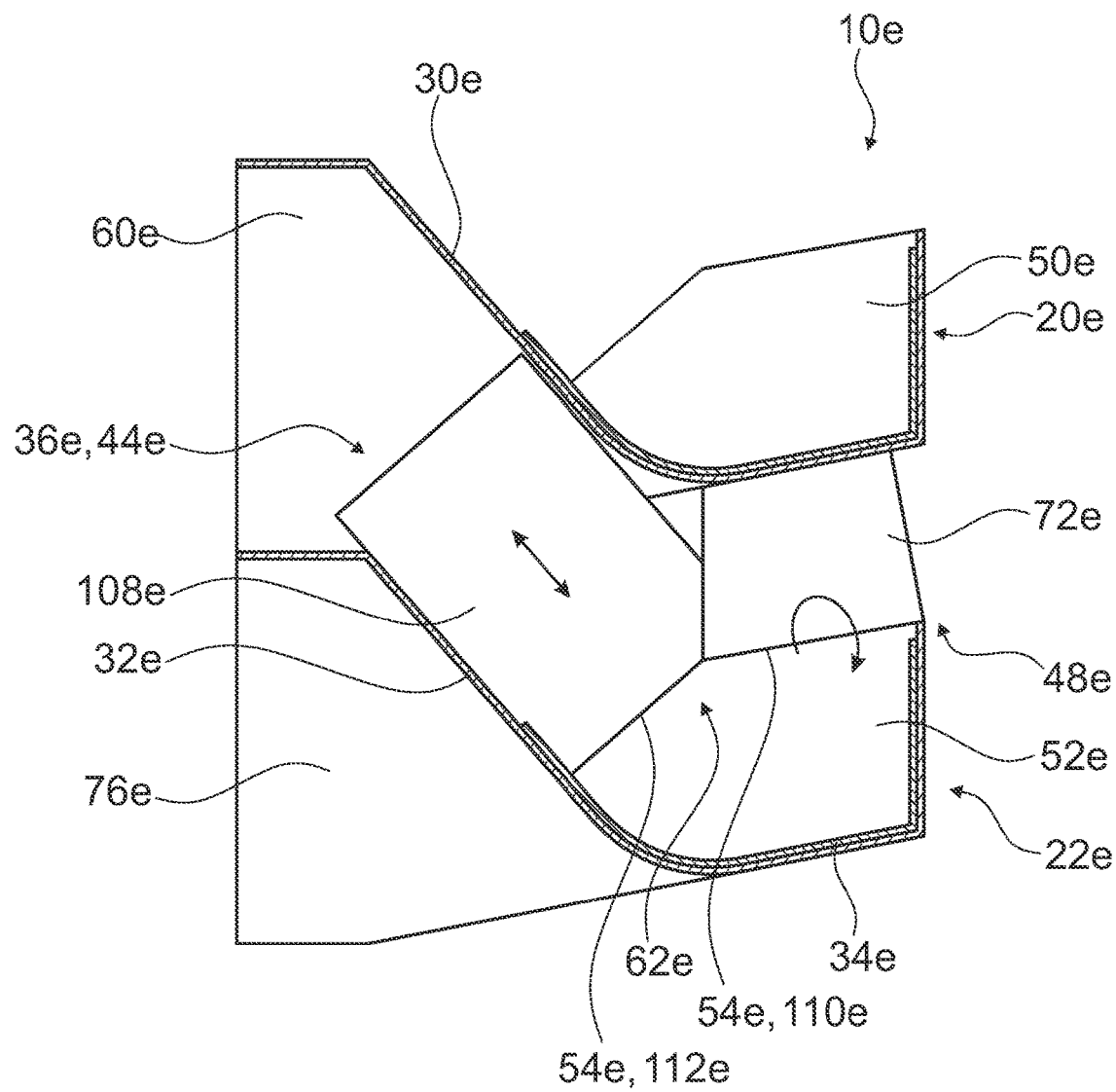

In the drawings:

FIG. 1 shows a schematic illustration of an aircraft cabin with an aircraft seat arrangement according to the invention in a first exemplary embodiment, FIG. 2 shows a schematic illustration of the aircraft seat arrangement according to the invention in the first exemplary embodiment, FIG. 3 shows a schematic illustration of the aircraft seat arrangement according to the invention in the first exemplary embodiment, FIG. 4 shows a schematic sectional illustration of the aircraft seat arrangement according to the invention in the first exemplary embodiment, FIG. 5 shows a schematic sectional illustration of the aircraft seat arrangement according to the invention in the first exemplary embodiment, FIG. 6 shows a schematic illustration of an aircraft seat region of the aircraft seat arrangement according to the invention in the first exemplary embodiment, FIG. 7 shows a schematic illustration of an aircraft seat device of the aircraft seat arrangement according to the invention in the first exemplary embodiment, FIG. 8 shows a schematic illustration of the aircraft seat device of the aircraft seat arrangement according to the invention in the first exemplary embodiment, FIG. 9 shows a schematic sectional illustration of an aircraft seat arrangement according to the invention in a second exemplary embodiment, FIG. 10 shows a schematic sectional illustration of an aircraft seat arrangement according to the invention in a third exemplary embodiment, FIG. 11 shows a schematic sectional illustration of an aircraft seat arrangement according to the invention in a fourth exemplary embodiment, and FIG. 12 shows a schematic sectional illustration of an aircraft seat arrangement according to the invention in a fifth exemplary embodiment.

DESCRIPTION OF THE EXEMPLARY EMBODIMENTS

In FIGS. 1 to 8 an aircraft seat arrangement 10a is shown in a first exemplary embodiment. The aircraft seat arrangement 10a is configured to be used in an aircraft cabin 56a of an aircraft. The aircraft has a flight direction 12a. The aircraft cabin 56a comprises an aircraft cabin floor 14a, which forms a mounting plane. In the present case the aircraft cabin 56a comprises exactly one aircraft cabin aisle 16a. Alternatively, it would also be conceivable that the aircraft cabin 56a comprises more than one aircraft cabin aisle. The aircraft cabin 56a comprises at least one aircraft cabin wall 18a.

The aircraft seat arrangement 10a comprises a first aircraft seat device 20a. The aircraft seat arrangement 10a comprises a second aircraft seat device 22a. The second aircraft seat device 22a is realized at least substantially identically to the first aircraft seat device 20a. The first aircraft seat device 20a and the second aircraft seat device 22a are respectively realized as a premium economy class aircraft seat device or as a business class aircraft seat device. The first aircraft seat device 20a and the second aircraft seat device 22a are configured to be mounted in the aircraft cabin 56a on the mounting plane. The first aircraft seat device 20a and the second aircraft seat device 22a each comprise a mounting unit (not illustrated in detail), which is configured to mount the aircraft seat device 20a, 22a on the mounting plane. The second aircraft seat device 22a is arranged directly behind the first aircraft seat device 20a. The first aircraft seat device 20a and the second aircraft seat device 22a each extend at least substantially over an entire space between the aircraft cabin aisle 16a and the aircraft cabin wall 18a.

The second aircraft seat device 22a has an aircraft seat device longitudinal axis 24a and an aircraft seat device transversal axis 26a. The aircraft seat device longitudinal axis 24a runs along fastening points of the second aircraft seat device 22a which are arranged one behind the other, in particular in an aisle-side or aisle-remote region of the second aircraft seat device 22a. In FIGS. 1 and 3 the aircraft seat device longitudinal axis 24a and the aircraft seat device transversal axis 26a are illustrated centrally in the aircraft seat device 22a for the sake of clarity. The fastening points are configured to connect the second aircraft seat device 22a to the aircraft cabin floor 14a. The fastening points are configured to be coupled with a fastening rail of the aircraft cabin floor 14a. The aircraft seat device longitudinal axis 24a is oriented at least substantially parallel to a main extension axis of the fastening rail. The aircraft seat device longitudinal axis 24a is oriented at least substantially parallel to an aircraft cabin longitudinal axis 114a of the aircraft cabin 56a. The aircraft seat device longitudinal axis 24a is oriented at least substantially parallel to the flight direction 12a. The aircraft seat device longitudinal axis 24a is oriented parallel to the mounting plane. The aircraft seat device transversal axis 26a is oriented orthogonally to the aircraft seat device longitudinal axis 24a. The aircraft seat device transversal axis 26a is oriented parallel to the mounting plane. The aircraft seat device transversal axis 26a is oriented at least substantially orthogonally to the aircraft cabin longitudinal axis 114a of the aircraft cabin 56a. The aircraft seat device transversal axis 26a intersects with the at least one aircraft cabin aisle 16a, the second aircraft seat device 22a and the at least one aircraft cabin wall 18a. The aircraft seat device transversal axis 26a is oriented at least substantially orthogonally to fastening rails of the aircraft cabin 56a. The aircraft seat device transversal axis 26a is oriented at least substantially parallel to a main extension axis of the second aircraft seat device 22a, in particular when viewed orthogonally to a plane that is parallel to the mounting plane.

A seat distance 28a between identical reference points of the first aircraft seat device 20a and the second aircraft seat device 22a is at most 97 cm. In the present case, the seat distance 28a between identical reference points of the first aircraft seat device 20a and the second aircraft seat device 22a is 35 inches. The seat distance 28a is measured parallel to the aircraft seat device longitudinal axis 24a.

The first aircraft seat device 20a has an enclosure 30a. The second aircraft seat device 22a has an enclosure 32a. The enclosure 32a of the second aircraft seat device 22a forms, at least in a subregion of the enclosure 32a of the second aircraft seat device 22a, a backrest wall 34a.

The first aircraft seat device 20a and the second aircraft seat device 22a together form an aircraft seat region 36a for a passenger 38a. The aircraft seat region 36a is intended for the sitting and lying-down stay of the passenger 38a during a flight. The aircraft seat region 36a has a TTL position 40a (cf. FIGS. 1, 2, 3, 6, 7 and 8). The aircraft seat region 36a has a sitting direction 42a, which is assumed by the passenger 38a in the TTL position 40a of the aircraft seat region 36a in a TTL phase. The aircraft seat region 36a has a lying-down position 44a (cf. FIGS. 4 and 5). The aircraft seat region 36a has a lying-down direction 46a. In principle, between the TTL position 40a and the lying-down position 44a of the aircraft seat region 36a further positions of the aircraft seat region 36a may be provided, which in particular form a combined sitting and lying-down position. The aircraft seat region 36a extends over a subregion of the first aircraft seat device 20a and also over a subregion of the second aircraft seat device 22a, in particular when viewed orthogonally to a plane parallel to the mounting plane. The aircraft seat region 36a is arranged at least substantially between the enclosure 30a of the first aircraft seat device 20a and the enclosure 32a of the second aircraft seat device 22a. The aircraft seat region 36a comprises an access region 48a. The access region 48a is realized as a passage that on the aisle side directly adjoins the aircraft cabin aisle 16a from the aircraft seat region 36a. The first aircraft seat device 20a and the second aircraft seat device 22a each have a direct access to the same aircraft cabin aisle 16a. The direct accesses of the first aircraft seat device 20a and of the second aircraft seat device 22a are independent from one another. The first aircraft seat device 20a comprises a seat bottom 50a, which is arranged outside the aircraft seat region 36a. The seat bottom 50a of the first aircraft seat device 20a is arranged on an aisle side. The second aircraft seat device 22a comprises a seat bottom 52a in the aircraft seat region 36a. The seat bottom 52a of the second aircraft seat device 22a forms a seat for the passenger 38a, in particular in the TTL position 40a of the aircraft seat region 36a. The seat bottom 52a of the second aircraft seat device 22a is embodied as a seat bench, on which the passenger 38a can assume different sitting positions. The seat bottom 52a of the second aircraft seat device 22a is arranged on an aisle side. The seat bottom 52a of the second aircraft seat device 22a is, in particular electromechanically, pneumatically and/or hydraulically, transferable from the TTL position 40a of the aircraft seat region 36a into the lying-down position 44a of the aircraft seat region 36a. In the lying-down position 44a, the seat bottom 52a of the second aircraft seat device 22a, in particular a seat surface of the seat bottom 52a, is inclined by an angle of 3 degrees with respect to the mounting plane.

The seat bottom 52a of the second aircraft seat device 22a has a seat bottom front edge 54a. In the present case, the seat bottom front edge 54a is realized at least substantially as a straight line. In principle, however, it is also conceivable that the seat bottom front edge 54a has a shape that differs at least partially from a straight line. In principle, the seat bottom front edge 54a may have respectively one radius at its lateral ends, in particular at the enclosure 32a of the second aircraft seat device 22a and/or at the access region 48a of the second aircraft seat device 22a.

The seat bottom front edge 54a of the seat bottom 52a of the second aircraft seat device 22a extends over a length of at least 70 cm. In the present case the seat bottom front edge 54a of the seat bottom 52a of the second aircraft seat device 22a extends over a length of 89 cm. A main extension axis of the seat bottom front edge 54a is oriented at an angle of at least 5 degrees with respect to the aircraft seat device transversal axis 26a of the second aircraft seat device 22a. The main extension axis of the seat bottom front edge 54a is oriented at an angle of at most 18 degrees with respect to the aircraft seat device transversal axis 26a of the second aircraft seat device 22a. In the present case the main extension axis of the seat bottom front edge 54a is oriented at an angle of 10 degrees with respect to the aircraft seat device transversal axis 26a of the second aircraft seat device 22a. The sitting direction 42a of the aircraft seat region 36a, assumed by the passenger 38a in the TTL position 40a of the aircraft seat region 36a in a TTL phase, is directed away from the access region 48a of the aircraft seat region 36a. The sitting direction 42a, assumed by the passenger 38a in the TTL position 40a of the aircraft seat region 36a in the TTL phase, is oriented orthogonally with respect to the main extension axis of the seat bottom front edge 54a of the seat bottom 52a of the second aircraft seat device 22a. The sitting direction 42a is oriented parallel to the mounting plane. In the present case, a directional component of the sitting direction 42a of the aircraft seat region 36a, assumed by the passenger 38a in the TTL position 40a of the aircraft seat region 36a in the TTL phase, points in the flight direction 12a. In principle, however, the directional component of the sitting direction 42a may also be oriented opposed to the flight direction 12a.

An inclination of the seat bottom 52a of the second aircraft seat device 22a can be changed between the TTL position 40a and the lying-down position 44a. The seat bottom 52a of the second aircraft seat device 22a is adjustable by means of an adjusting mechanism (not illustrated in detail) of the second aircraft seat device 22a. The seat bottom 52a of the second aircraft seat device 22a is pivotable between the TTL position 40a and the lying-down position 44a by an angle of at least 8 degrees relative to the mounting plane. In the present case the seat bottom 52a of the second aircraft seat device 22a is pivotable between the TTL position 40a and the lying-down position 44a by an angle of 11 degrees relative to the mounting plane.

The second aircraft seat device 22a comprises the backrest wall 34a. The backrest wall 34a of the second aircraft seat device 22a is configured such that the passenger 38a can support himself on the backrest wall 34a in different postures. The backrest wall 34a of the second aircraft seat device 22a is concavely curved on a side facing towards the aircraft seat region 36a. The seat bottom 52a of the second aircraft seat device 22a together with the backrest wall 34a of the second aircraft seat device 22a forms a niche in which the passenger 38a can stay and sit. The backrest wall 34a of the second aircraft seat device 22a forms a concavely-curved support surface 58a, in particular for a back of the passenger 38a. The passenger 38a can lean against different regions of the support surface 58a. For example, the passenger 38a may lean against the support surface 58a in a region of the backrest wall 34a that adjoins the aircraft cabin aisle 16a. Alternatively, the passenger 38a may lean against the support surface 58a in a region of the backrest wall 34a that faces away from the aisle. The backrest wall 34a of the second aircraft seat device 22a is realized integrally with the enclosure 32a of the second aircraft seat device 22a. In principle, however, it would also be conceivable that the second aircraft seat device 22a has a structure by means of which the backrest wall 34a of the second aircraft seat device 22a is connected to the enclosure 32a of the second aircraft seat device 22a. The backrest wall 34a of the second aircraft seat device 22a is realized at least partially as a cushion. On a front side of the backrest wall 34a, which faces towards the aircraft seat region 36a, the backrest wall 34a of the second aircraft seat device 22a has an inclination that forms an angle between 90 degrees and 120 degrees with respect to the mounting plane. The backrest wall 34a has an upper region 116a and a lower region 118a. The upper region 116a of the backrest wall 34a is configured to support a head of the passenger 38a. In the present case, the upper region 116a of the backrest wall 34a is also configured to support a nape. In principle, the upper region 116a of the backrest wall 34a may also be configured to support an, in particular upper, region of a shoulder of the passenger 38a. In the present case the passenger corresponds to a large percentile. The upper region 116a of the backrest wall 34a forms a headrest. The lower region 118a of the backrest wall 34a is configured to support a back and/or a shoulder of the passenger 38a. In the present case, the upper region 116a of the backrest wall 34a is arranged in an upper third of an extent between the seat bottom 52a of the second aircraft seat device 22a and an upper edge of the enclosure 32a of the second aircraft seat device 22a. The upper region 116a of the backrest wall 34a is arranged so as to be immobile, in particular relative to the enclosure 32a of the second aircraft seat device 22a and to the mounting unit of the second aircraft seat device 22a. The upper region 116a of the backrest wall 34a is realized so as to be permanently stationary, in particular independently from the TTL position and/or the lying-down position of the aircraft seat region 36a. The lower region 118a of the backrest wall 34a is arranged in two lower thirds of an extent between the seat bottom 52a of the second aircraft seat device 22a and an upper edge of the enclosure 32a of the second aircraft seat device 22a. The lower region 118a of the backrest wall 34a forms a backrest. In principle, the lower region 118a of the backrest wall 34a may also be realized as a lumbar region. The lower region 118a of the backrest wall 34a is arranged directly below the upper region 116a of the backrest wall 34a. The lower region 118a of the backrest wall 34a is arranged between the seat bottom 52a of the second aircraft seat device 22a and the upper region 116a of the backrest wall 34a. The backrest wall 34a is realized so as to be at least partially immobile, in particular not pivotable. The backrest wall 34a is immobile in the upper region 116a of the backrest wall 34a. The backrest wall 34a is not pivotable in the upper region 116a of the backrest wall 34a. The entire backrest wall 34a as such is not completely pivotable. In the lying-down position 44a of the aircraft seat region 36a, the backrest wall 34a does not form any portion of a lying-down surface 62a. In the present case, the backrest wall 34a of the second aircraft seat device 22a is adjustable with regard to its orientation in a subregion 120a in the lower region 118a of the backrest wall 34a. The subregion 120a is comprised by the backrest wall 34a in the lower region 118a of the backrest wall 34a. The subregion 120a of the backrest wall 34a is arranged in the lower region 118a of the backrest wall 34a. In the present case, the subregion 120a of the backrest wall 34a extends over an entire height extent from the seat bottom 52a to the upper region 116a of the backrest wall 34a. The subregion 120a of the backrest wall 34a extends over at least 50% of a transversal extent of the backrest wall 34a parallel to the aircraft seat device transversal axis 26a. The subregion 120a of the backrest wall 34a is arranged on an aisle side, in particular viewed relative to the seat bottom 52a. The backrest wall 34a of the second aircraft seat device 22a can be articulated in the subregion 120a. In the subregion 120a of the backrest wall 34a the orientation of the backrest wall 34a can be changed. In the subregion 120a of the backrest wall 34a, the backrest wall 34a is configured to be pivoted around an axis 122a, which is oriented at least substantially orthogonally to a sitting plane of the seat bottom 52a. The axis 122a herein extends through the backrest wall 34a. In the subregion 120a of the backrest wall 34a, the backrest wall 34a is configured to be moved frontwards. In the present case, the backrest wall 34a comprises an unfoldable back support element 68a in the subregion 120a. The unfoldable back support element 68a forms the subregion 120a. In an unfolded state, the unfoldable back support element 68a is oriented at least substantially perpendicular to the lying-down direction 46a, in particular when viewed in a cross-sectional plane that is at least substantially parallel to the lying-down plane. The back support element 68a is supported pivotably via the axis 122a. The lying-down axis 64a intersects with the unfoldable back support element 68a. As a result, for example, a further sitting direction is enabled in an advantageously comfortable manner, wherein the further sitting direction is at least substantially parallel to the lying-down direction 46a. This allows the passenger 38a assuming an advantageously comfortable sitting posture, in which legs of the passenger 38a lie towards the ottoman 60a of the first aircraft seat device 20a on the lying-down surface 62a and at least substantially along the lying-down axis 64a.

The second aircraft seat device 22a comprises an actuating unit (not illustrated in detail), which is configured to adjust the backrest wall 34a in the subregion of the backrest wall 34a. The actuating unit is configured for an adjustment of the back support element 68a. For example, the actuating unit may comprise a tab which the passenger 38a can pull for an adjustment of the orientation of the backrest wall 34a in the subregion of the backrest wall 34a. In principle, the actuating unit may comprise at least one spring, in particular a return spring.

Alternatively or additionally, it would also be conceivable that in the subregion of the backrest wall 34a the backrest wall 34a is configured to be pivoted around an axis which is oriented at least substantially parallel to the mounting plane, said axis being arranged in a transition region of the lower region, wherein the transition region is arranged directly below the upper region of the backrest wall 34a. As a result, an inclination of the backrest wall 34a in the lower region is advantageously enabled without having to move the upper region of the backrest wall 34a.

Additionally or alternatively, the backrest wall 34a of the second aircraft seat device 22a may be adjustable in shape in the subregion in the lower region of the backrest wall 34a.

The backrest wall 34a is in the lower region in the subregion of the backrest wall 34a embodied as an adjustable lumbar support. Herein the backrest wall 34a is adjustable in shape in the lower region of the backrest wall 34a, in particular on a front side of the backrest wall 34a that faces towards the aircraft seat region 36a. In principle, however, it would also be conceivable that the backrest wall 34a is realized completely immobile. It would be conceivable that the backrest wall 34a of the second aircraft seat device 22a, apart from a cushion, is realized so as to be overall rigid.

Differing from the sitting direction 42a assumed by the passenger 38a in the TTL position 40a of the aircraft seat region 36a in the TTL phase, further sitting directions (not shown) are possible, which can be assumed by the passenger 38a in the TTL position 40a in a cruise flight phase. The passenger 38a is permitted to assume the further sitting directions in the cruise flight phase but not in the TTL phase. The further sitting directions differ from the sitting direction 42a assumed by the passenger 38a in the TTL position 40a of the aircraft seat region 36a in the TTL phase. The further sitting directions, which differ from the sitting direction 42a assumed by the passenger 38a in the TTL position 40a of the aircraft seat region 36a in the TTL phase, may be oriented at an angle of up to +/−90 degrees with respect to the sitting direction 42a assumed by the passenger 38a in the TTL position 40a of the aircraft seat region 36a in the TTL phase. A position of the buttocks of the passenger 38a on the seat bench is freely selectable in the cruise flight phase. For example, the passenger 38a may assume an upright sitting posture during the TTL phase, in which the sitting direction 42a is oriented at least substantially orthogonally to the seat bottom front edge 54a. Alternatively, the passenger 38a may assume further, in particular upright, sitting postures on the seat bench, in which in particular a back of the passenger 38a may be oriented differently. For example, the passenger 38a may sit cross-legged on the seat bottom 52a of the second aircraft seat device 22a.

The second aircraft seat device 22a comprises a literature pouch 124a. The literature pouch 124a of the second aircraft seat device 22a is arranged in the aircraft seat region 36a. The literature pouch 124a of the second aircraft seat device 22a is integrated in a cushion of the backrest wall 34a of the second aircraft seat device 22a, or is arranged behind a support surface of the cushion of the backrest wall 34a. The literature pouch 124a of the second aircraft seat device 22a is arranged in a region of the backrest wall 34a of the second aircraft seat device 22a, which faces away from the aisle. The literature pouch 124a of the second aircraft seat device 22a is arranged in such a way that it adjoins a frontal outer region of the seat bottom 52a of the second aircraft seat device 22a.

The first aircraft seat device 20a comprises an ottoman 60a in the aircraft seat region 36a. In the lying-down position 44a of the aircraft seat region 36a, the ottoman 60a of the first aircraft seat device 20a together with the seat bottom 52a of the second aircraft seat device 22a forms at least a portion of the lying-down surface 62a of the aircraft seat region 36a. The lying-down surface 62a forms a lying-down plane of the aircraft seat region 36a. The passenger 38a can assume a sleeping position on the lying-down surface 62a. The lying-down surface 62a of the aircraft seat region 36a is arranged at least substantially in a plane, which is in particular inclined by an angle of 3 degrees with respect to the mounting plane. The lying-down surface 62a of the aircraft seat region 36a is arranged between the enclosure 30a of the first aircraft seat device 20a and the enclosure 32a of the second aircraft seat device 22a. The lying-down surface 62a is equivalent at least to a large portion of an entire surface extending between the enclosure 30a of the first aircraft seat device 20a and the enclosure 32a of the second aircraft seat device 22a and also between the aircraft cabin wall 18a and the aircraft cabin aisle 16a, in particular when viewed orthogonally to a plane parallel to the mounting plane.

The lying-down direction 46a differs from the sitting direction 42a. The lying-down direction 46a of the aircraft seat region 36a includes a larger angle with the aircraft seat longitudinal axis 24a than the sitting direction 42a of the aircraft seat region 36a that is assumed by the passenger 38a in the TTL position 40a of the aircraft seat region 36a in the TTL phase. The lying-down direction 46a of the aircraft seat region 36a is oriented at an angle of at most 57 degrees with respect to the aircraft seat device longitudinal axis 24a of the second aircraft seat device 22a. The lying-down direction 46a of the aircraft seat region 36a is oriented at an angle of at least 30 degrees with respect to the aircraft seat device longitudinal axis 24a of the second aircraft seat device 22a. In the present case, the lying-down direction 46a of the aircraft seat region 36a is oriented at an angle of 49 degrees with respect to the aircraft seat device longitudinal axis 24a of the second aircraft seat device 22a. The lying-down direction 46a of the aircraft seat region 36a is directed away from the access region 48a of the aircraft seat region 36a. In the present case, a directional component of the lying-down direction 46a of the aircraft seat region 36a, assumed by the passenger 38a in the lying-down position 44a of the aircraft seat region 36a, points in flight direction 12a. In principle, however, the directional component of the lying-down direction 46a may also be oriented opposed to the flight direction 12a. In principle, it is also conceivable that the directional component of the lying-down direction 46a is oriented opposed to the directional component of the sitting direction 42a assumed by the passenger 38a in the TTL position 40a of the aircraft seat region 36a in the TTL phase.

The lying-down direction 46a is directed from a head region of the lying-down surface 62a into a foot region of the lying-down surface 62a. The head region of the lying-down surface 62a is arranged on the seat bottom 52a of the second aircraft seat device 22a. The head region of the lying-down surface 62a is configured for a head of the passenger 38a resting thereon. The foot region of the lying-down surface 62a is arranged on the ottoman 60a of the first aircraft seat device 20a. The foot region of the lying-down surface 62a is configured for the feet of the passenger 38a resting thereon. The aircraft seat region 36a has a lying-down axis 64a. The lying-down direction 46a is arranged coaxially with the lying-down axis 64a. The lying-down axis 64a extends along an idealized straight spine of the passenger 38a, in particular when the passenger 38a is lying in the aircraft seat region 36a. The lying-down axis 64a of the aircraft seat region 36a is oriented at least substantially parallel to a further subregion of the enclosure 32a of the second aircraft seat device 22a. The further subregion of the enclosure 32a of the second aircraft seat device 22a extends between the seat bottom 52a of the second aircraft seat device 22a and the ottoman 60a of the first aircraft seat device 20a. In particular when viewed in a cross-sectional plane that is at least substantially parallel to the mounting plane, the enclosure 32a of the second aircraft seat device 22a extends in the further subregion of the enclosure 32a at least substantially along a straight line. In the present case, the straight line is oriented at an angle of 49 degrees with respect to the aircraft seat device longitudinal axis 24a. In principle, in the further subregion the enclosure 32a of the second aircraft seat device 22*a* may extend in a straight line along a constructional straight line, or it is an imaginary straight line determined via an arithmetic mean of points on the enclosure 32*a* of the second aircraft seat device 22*a*, in particular in the further subregion of the enclosure 32*a*. The lying-down axis 64*a* of the aircraft seat region 36*a* is oriented at least substantially parallel to the straight line along which the enclosure 32*a* of the second aircraft seat device 22*a* at least substantially extends in the further subregion of the enclosure 32*a*, in particular when viewed in a cross-sectional plane that is at least substantially parallel to the lying-down plane. The cross-sectional plane intersects with the enclosure 30*a* of the first aircraft seat device 20*a* and the enclosure 32*a* of the second aircraft seat device 22*a*, in particular directly above the lying-down plane. The cross-sectional plane is arranged at the level of the lying-down surface 62*a* of the aircraft seat region 36*a*.

A maximal lying-down length 66*a* in the aircraft seat region 36*a* is at least 198 cm. The maximal lying-down length 66*a* is determined by means of a 9-inch ball method. Herein two spaced-apart balls 126*a*, 128*a* with a 9-inch diameter are used for measuring the lying-down length 66*a* (cf. FIG. 5). The two balls 126*a*, 128*a* respectively lie tangentially at lying-down surface boundaries, in particular on the one hand at the backrest wall 34*a* of the second aircraft seat device 22*a* and on the other hand at the enclosure 30*a* of the first aircraft seat device 20*a*, with a maximally possible distance of the balls 126*a*, 128*a* from each other. The maximal lying-down length 66*a* corresponds to a distance of maximally spaced-apart points of the two balls 126*a*, 128*a* in the aircraft seat region 36*a*. The two balls 126*a*, 128*a* lie upon the lying-down surface 62*a* of the aircraft seat region 36*a*. The lying-down axis 64*a* runs in the present case parallel to a straight line 130*a* which connects the maximally spaced-apart points of the two balls 126*a*, 128*a* to each other. In principle, the lying-down axis 64*a* may also be situated on the straight line 130*a*. In the present case the passenger 38*a* is a man who corresponds to the 95 percentile. The maximal lying-down length 66*a* may in principle also be measured along the lying-down axis 64*a*.

In the TTL position 40*a* of the aircraft seat region 36*a*, a free space 70*a*, which is free of an at least substantially horizontally-extending support surface, is arranged between the enclosure 32*a* of the second aircraft seat device 22*a* and the access region 48*a* of the aircraft seat region 36*a*. The free space 70*a* is configured for feet and/or legs of the passenger 38*a* to be positioned therein, in particular in the TTL position 40*a* of the aircraft seat region 36*a*. The free space 70*a* extends at least substantially from the mounting plane at least to an upper edge of the seat bottom 52*a* of the second aircraft seat device 22*a*. In the TTL position 40*a*, the lying-down surface 62*a* is interrupted by the free space 70*a* (cf. FIGS. 1, 2, 3, 6, 7 and 8). In the lying-down position 44*a* of the aircraft seat region 36*a*, the lying-down surface 62*a* of the aircraft seat region 36*a* at least substantially penetrates and/or bridges the free space 70*a* (cf. FIGS. 4 and 5).

In the present case, a stowage space 132*a* of the first aircraft seat device 20*a* is arranged underneath the ottoman 60*a* of the first aircraft seat device 20*a* (cf. FIG. 7). The stowage space 132*a* is configured for storing luggage and/or other personal items of the passenger 38*a*. In principle, however, the stowage space 132*a* may also be used as a footwell for augmenting a leg clearance. In the present case, the stowage space 132*a* and the free space 70*a* are directly connected to each other. The stowage space 132*a* is accessible from the free space 70*a*. In principle, however, it is also conceivable that the stowage space 132*a* and the free space 70*a* are structurally separate from each other, the stowage space 132*a* being accessible from another aircraft seat region, which is arranged in front of the aircraft seat region 36*a* and is realized partially by the first aircraft seat device 20*a*.

The second aircraft seat device 22*a* comprises a movable leg support element 72*a*. The leg support element 72*a* of the second aircraft seat device 22*a* is coupled with the seat bottom 52*a* of the second aircraft seat device 22*a*. The leg support element 72*a* of the second aircraft seat device 22*a* is realized as a leg support which can be utilized independently from the lying-down position 44*a* of the aircraft seat region 36*a*. The leg support element 72*a* of the second aircraft seat device 22*a* is continuously adjustable. In the TTL position 40*a* of the aircraft seat region 36*a*, the leg support element 72*a* of the second aircraft seat device 22*a* is arranged in a stowage position outside the free space 70*a*. The leg support element 72*a* is movable into the free space 70*a*. By means of the movable leg support element 72*a*, the free space 70*a* can be at least partially filled in order to create the lying-down surface 62*a*. In the lying-down position 44*a* of the aircraft seat region 36*a*, the leg support element 72*a* is arranged between the seat bottom 52*a* of the second aircraft seat device 22*a* and the enclosure 30*a* of the first aircraft seat device 20*a*. In the lying-down position 44*a* of the aircraft seat region 36*a*, the leg support element 72*a* of the second aircraft seat device 22*a* forms a portion of the lying-down surface 62*a*. In principle, it is conceivable that in the lying-down position 44*a* of the aircraft seat region 36*a*, the passenger 38*a* rests on the leg support element 72*a* of the second aircraft seat device 22*a* with body parts other than his/her legs. In the lying-down position 44*a* of the aircraft seat region 36*a*, the passenger 38*a* lies on the leg support element 72*a* at least partially with his/her upper body. The leg support element 72*a* of the second aircraft seat device 22*a* is coupled with the seat bottom 52*a* of the second aircraft seat device 22*a* in a pivotable and/or translationally deployable manner. The leg support element 72*a* of the second aircraft seat device 22*a* is supported at the seat bottom 52*a* of the second aircraft seat device 22*a*. The leg support element 72*a* of the second aircraft seat device 22*a* is electromechanically, pneumatically and/or hydraulically movable. The leg support element 72*a* is movable relative to the seat bottom 52*a* of the second aircraft seat device 22*a* by means of an adjusting mechanism (not illustrated in detail) of the second aircraft seat device 22*a*. In principle, however, it would also be conceivable that the leg support element 72*a* of the second aircraft seat device 22*a* is movable manually.

The second aircraft seat device 22*a* comprises a movable support element 74*a*. The movable support element 74*a* is configured to form a portion of the lying-down surface 62*a*. In the TTL position 40*a* of the aircraft seat region 36*a*, the support element 74*a* of the second aircraft seat device 22*a* is arranged in a stowage position outside the free space 70*a*. The support element 74*a* is movable into the free space 70*a*. By means of the movable support element 74*a*, the free space 70*a* can be at least partially filled in order to create the lying-down surface 62*a*. In the lying-down position 44*a* of the aircraft seat region 36*a*, the support element 74*a* is arranged between the seat bottom 52*a* of the second aircraft seat device 22*a* and the ottoman 60*a* of the first aircraft seat device 20*a*. In the lying-down position 44*a* of the aircraft seat region 36*a*, the support element 74*a* of the second aircraft seat device 22*a* forms a portion of the lying-down surface 62*a*. In the lying-down position 44*a* of the aircraft seat region 36*a*, the passenger 38*a* lies on the support element 74*a* of the second aircraft seat device 22*a* at least partially with his/her upper body and/or with his/her buttocks. The support element 74*a* of the second aircraft seat device 22*a* is electromechanically, pneumatically and/or hydraulically movable. The support element 74*a* is movable relative to the leg support element 72*a* of the second aircraft seat device 22*a* by means of an adjusting mechanism (not illustrated in detail) of the second aircraft seat device 22*a*. In principle, however, it would also be conceivable that the support element 74*a* of the second aircraft seat device 22*a* is movable manually.

The support element 74*a* of the second aircraft seat device 22*a* is supported movably at the seat bottom 52*a* of the second aircraft seat device 22*a* and/or at the mounting unit of the second aircraft seat device 22*a*. The support element 74*a* of the second aircraft seat device 22*a* is coupled with the seat bottom 52*a* of the second aircraft seat device 22*a* and/or with the mounting unit of the second aircraft seat device 22*a* in a deployable and/or pivotable manner. Alternatively, it would also be conceivable that the support element 74*a* of the second aircraft seat device 22*a* is supported movably at the leg support element 72*a* of the second aircraft seat device 22*a*. In such a case, the support element 74*a* of the second aircraft seat device 22*a* would be supported in a deployable and/or extractable manner with respect to the leg support element 72*a* of the second aircraft seat device 22*a*. The support element 74*a* of the second aircraft seat device 22*a* is herein in at least one operation state integrated in the leg support element 72*a* of the second aircraft seat device 22*a*. Alternatively, it would also be conceivable that the support element 74*a* is supported movably at the enclosure 32*a* of the second aircraft seat device 22*a* and/or at an ottoman 76*a* of the second aircraft seat device 22*a*. In such a case, the support element 74*a* of the second aircraft seat device 22*a* is supported in a deployable, extractable, pivotable and/or foldable manner in and/or at the enclosure 32*a* of the second aircraft seat device 22*a* and/or in the ottoman 76*a* of the second aircraft seat device 22*a*.

In the lying-down position 44*a* of the aircraft seat region 36*a*, the leg support element 72*a* and the support element 74*a* are arranged directly side by side. The leg support element 72*a* and the support element 74*a* form the lying-down surface 62*a* of the aircraft seat region 36*a* together with the seat bottom 52*a* of the second aircraft seat device 22*a* and the ottoman 60*a* of the first aircraft seat device 20*a*. In the lying-down position 44*a* of the aircraft seat region 36*a*, the leg support element 72*a* and the support element 74*a* are at least substantially arranged in the free space 70*a* and fill the free space 70*a* at least substantially in the region of the lying-down surface 62*a*. The seat bottom 52*a* of the second aircraft seat device 22*a* is configured to provide a possibility of support at least for a head and a shoulder of the passenger 38*a* in the lying-down position 44*a* of the aircraft seat region 36*at*. The leg support element 72*a* of the second aircraft seat device 22*a* is configured to provide a possibility of support at least for an arm of the passenger 38*a* in the lying-down position 44*a* of the aircraft seat region 36*a*. The support element 74*a* of the second aircraft seat device 22*a* is configured to provide a possibility of support at least for a torso of the passenger 38*a* in the lying-down position 44*a* of the aircraft seat region 36*a*. The ottoman 60*a* of the first aircraft seat device 20*a* is configured to provide a possibility of support at least for feet and legs of the passenger 38*a* in the lying-down position 44*a* of the aircraft seat region 36*a*. In the present case, the leg support element 72*a* and the support element 74*a* contact each other in the lying-down position 44*a* of the aircraft seat region 36*a*. In principle, however, it would also be conceivable that in the lying-down position 44*a* of the aircraft seat region 36*a*, the leg support element 72*a* and the support element 74*a* are spaced apart from each other by at most 3 cm in the region of the lying-down surface 62*a*. The leg support element 72*a* and the support element 74*a* are configured to mutually support each other in the lying-down position 44*a* of the aircraft seat region 36*a*. The leg support element 72*a* and the support element 74*a* each comprise prop elements which correspond to each other and are configured to transmit support forces acting on the leg support element 72*a* and on the support element 74*a* into the mounting unit of the second aircraft seat device 22*a* via the lying-down surface 62*a*. The lying-down surface 62*a* of the aircraft seat region 36*a* extends at least substantially completely over the seat bottom 52*a* of the second aircraft seat device 22*a*, the leg support element 72*a* of the second aircraft seat device 22*a*, the support element 74*a* of the second aircraft seat device 22*a* and the ottoman 60*a* of the first aircraft seat device 20*a*.

In principle, it is also conceivable that, for a reduced lying-down surface, only the support element 74*a* is transferred into the lying-down position 44*a*. In this way it is possible to use a reduced lying-down surface, which in particular requires a narrower lying-down position of the passenger 38*a* adjoining the enclosure 32*a* of the second aircraft seat device 22*a*, by unfolding the support element 74*a* that adjoins the ottoman 60*a* of the first aircraft seat device 20*a*, and also to use a footwell in the free space 70*a* by the folded-in leg support element 72*a*. This allows achieving an advantageous combination of the TTL position 40*a* and the lying-down position 44*a*. Furthermore, in this way an advantageously comfortable and quick change of position of the passenger is enabled, without having to adjust the entire aircraft seat region between the TTL position 40*a* and the lying-down position 44*a*. Furthermore, by a lowering the leg support element 72*a*, which is necessary for the complete lying-down surface 62*a*, a quick change of position of the passenger 38*a* from a lying-down position into a sitting position is enabled.

The mounting units of the first aircraft seat device 20*a* and of the second aircraft seat device 22*a* may in each case be realized similar to an economy class seat frame with regard to their type of construction. The mounting units may each comprise at least two support tubes, which are oriented at least substantially in the aircraft seat device transversal axis 26*a*. The mounting units may in each case comprise two seat bases via which the support tubes are connected to the aircraft cabin floor 14*a* in a mounted state. The seat bottom 52*a* and the ottoman 76*a* of the second aircraft seat device 22*a* are connected to the mounting unit via the support tubes.

In the present case, the leg support element 72*a* comprises a functional element 78*a*, which in the lying-down position 44*a* of the aircraft seat region 36*a* is arranged between the enclosure 30*a* of the first aircraft seat device 20*a* and the seat bottom 52*a* of the second aircraft seat device 22*a*, and which can be utilized by the passenger 38*a* in the lying-down position 44*a* of the aircraft seat region 36*a*. In the present case the functional element 78*a* is embodied as a beverage holder. Alternatively, it would be conceivable that the functional element 78*a* is realized as a PED holder and/or as a book support. Alternatively, the functional element 78*a* could also be realized, for example, as a plug socket. The functional element 78*a* is integrated in the leg support element 72*a*. The functional element 78*a* projects away from the lying-down surface 62*a* by at most 10 cm, in particular measured orthogonally to the lying-down surface 62*a*. In principle, it would also be conceivable that the enclosure 30*a* of the first aircraft seat device 20*a* or the enclosure 32*a* of the second aircraft seat device 22a comprises the functional element 78a. It would herein be in principle conceivable that the functional element 78a can be unfolded or deployed from the enclosure 30a of the first aircraft seat device 20a or from the enclosure 32a of the second aircraft seat device 22a. Alternatively or additionally, it would be conceivable that the support element 74a comprises the functional element 78a and/or a further functional element, which in the lying-down position 44a of the aircraft seat region 36a is arranged between the enclosure 30a of the first aircraft seat device 20a and the seat bottom 52a of the second aircraft seat device 22a, and which can be utilized by the passenger 38a in the lying-down position 44a of the aircraft seat region 36a.

The second aircraft seat device 22a comprises an armrest unit 80a arranged on an aisle side. The armrest unit 80a of the second aircraft seat device 22a is realized so as to be adjustable in height, in particular so as to be lowerable below an upper edge of the seat bottom 52a of the second aircraft seat device 22a. The armrest unit 80a of the second aircraft seat device 22a is traversable under and beyond a normal position towards the mounting plane. The armrest unit 80a of the second aircraft seat device 22a is in at least one operation state (not illustrated in detail) realized as a privacy element. The armrest unit 80a of the second aircraft seat device 22a is traversable beyond the normal position and away from the mounting plane. The armrest unit 80a of the second aircraft seat device 22a is herein arranged in the access region 48a of the aircraft seat region 36a. The armrest unit 80a comprises an armrest, which is realized so as to be foldable, in particular towards the aircraft cabin aisle 16a. In this way the armrest can be advantageously stowed when the passenger 38a leans against the support surface 58a. In principle, it would also be conceivable that the armrest unit 80a of the second aircraft seat device 22a comprises a flap element, which is unfoldable upwards above the armrest of the armrest unit 80a.

The first aircraft seat device 20a comprises a table unit 134a (cf. FIG. 7). The table unit 134a of the first aircraft seat device 20a is arranged in the aircraft seat region 36a. The table unit 134a is arranged at the enclosure 30a of the first aircraft seat device 20a, in particular on a backrest wall of the first aircraft seat device 20a. The table unit 134a comprises a guide rail 136a, which is fixedly connected to the enclosure 30a of the first aircraft seat device 20a and is arranged in the aircraft seat region 36a. The table unit 134a comprises a table 138a, which is supported in the aircraft seat region 36a so as to be movable via the guide rail 136a. The guide rail 136a is configured to transfer the table 138a at least substantially horizontally from a stowage position into a use position. The table 138a of the table unit 134a is supported at the enclosure 30a of the first aircraft seat device 20a so as to be movable along the guide rail 136a. The table 138a is pivotable via the guide rail 136a by at least 45 degrees, in particular in a plane oriented at least substantially parallel to the mounting plane. Alternatively, the table 138a may also in at least one operation state be arranged at least substantially vertically at the enclosure 30a of the first aircraft seat device 20a.

The aircraft seat arrangement 10a comprises a third aircraft seat device 82a. The third aircraft seat device 82a is realized at least substantially identically to the first aircraft seat device 20a. The third aircraft seat device 82a is arranged directly behind the second aircraft seat device 22a. The second aircraft seat device 22a is arranged between the first aircraft seat device 20a and the third aircraft seat device 82a. The second aircraft seat device 22a and the third aircraft seat device 82a together form a further aircraft seat region 84a for a further passenger. The third aircraft seat device 82a has an enclosure 86a. The further aircraft seat region 84a is arranged at least substantially between the enclosure 32a of the second aircraft seat device 22a and the enclosure 86a of the third aircraft seat device 82a. The second aircraft seat device 22a comprises the ottoman 76a. The ottoman 76a of the second aircraft seat device 22a is arranged outside the aircraft seat region 36a. The ottoman 76a of the second aircraft seat device 22a is arranged in the further aircraft seat region 84a. In a lying-down position of the further aircraft seat region 84a, the ottoman 76a of the second aircraft seat device 22a together with a seat bottom 88a of the third aircraft seat device 82a forms at least a portion of a lying-down surface of the further aircraft seat region 84a.

The second aircraft seat device 22a comprises a console 90a. The console 90a of the second aircraft seat device 22a is arranged to a side, facing away from the aisle, of the seat bottom 52a of the second aircraft seat device 22a. The console 90a of the second aircraft seat device 22a is arranged at least partially above the ottoman 76a of the second aircraft seat device 22a. The console 90a of the second aircraft seat device 22a is connected to the enclosure 32a of the second aircraft seat device 22a. The console 90a of the second aircraft seat device 22a adjoins the further subregion of the enclosure 32a of the second aircraft seat device 22a, in which the enclosure 32a of the second aircraft seat device 22a extends at least substantially along a straight line, in particular when viewed in a cross-sectional plane that is at least substantially parallel to the mounting plane. The console 90a of the second aircraft seat device 22a comprises several operating elements as well as electronic and/or electrical interfaces. The operating elements are configured for controlling in-flight entertainment, illumination of the aircraft seat region 36a and/or crew notification. The electronic and/or electrical interfaces are realized, for example, as a plug socket. The console 90a of the second aircraft seat device 22a comprises a screen 96a, which is arranged in the further aircraft seat region 84a. The console 90a of the second aircraft seat device 22a comprises at least one stowage compartment 98a. The stowage compartment 98a is arranged between the operating elements and/or the electronic and/or electrical interfaces and the aircraft cabin wall 18a. In principle, it would be conceivable that the stowage compartment 98a is embodied as a minibar. The console 90a of the second aircraft seat device 22a comprises a deposition surface 100a, which is arranged, offset in height, to a side of the ottoman 60a of the first aircraft seat device 20a. The console 90a of the second aircraft seat device 22a partially projects above a console 102a of the third aircraft seat device 82a.

The first aircraft seat device 20a comprises a console 140a. The console 140a of the first aircraft seat device 20a is arranged at least partially above the ottoman 60a of the first aircraft seat device 20a. The console 140a of the first aircraft seat device 20a is realized at least substantially identically to the console 90a of the second aircraft seat device 22a. The console 140a of the first aircraft seat device 20a partially projects above the console 90a of the second aircraft seat device 22a. The console 140a of the first aircraft seat device 20a partially overlaps the deposition surface 100a of the console 90a of the second aircraft seat device 22a, wherein the console 140a of the first aircraft seat device 20a is arranged in the region of the deposition surface 100a above the deposition surface 100a. The console 140a of the first aircraft seat device 20a comprises a screen 142a, which is arranged in the aircraft seat region 36a.

The second aircraft seat device 22a comprises a separating unit 144a. The separating unit 144a is supported movably, in particular translationally displaceably, on the enclosure 32a of the second aircraft seat device 22a. The separating unit 144a is configured to separate the aircraft seat region 36a, at least optically, from the aircraft cabin aisle 16a. The separating unit 144a is configured to close the access region 48a of the aircraft seat region 36a at least partially, preferably at least to a large extent. This allows advantageously improving privacy in the aircraft seat region 36a and thus comfort. Alternatively, it would also be conceivable that the separating unit 144a is configured to close an access region of the further aircraft seat region 84a at least partially, preferably at least to a large extent. The separating unit 144a comprises several light-permeable elements 146a, which in a closed state of the separating unit 144a are arranged in the access region 48a. The elements 146a are configured to enable an exchange of light between the aircraft cabin aisle 16a and the aircraft seat region 36a.

In FIG. 1 the aircraft cabin 56a is shown, in which the first aircraft seat device 20a, the second aircraft seat device 22a and the third aircraft seat device 82a are arranged. The aircraft cabin 56a preferably comprises the aircraft seat arrangement 10a. The aircraft cabin 56a comprises the aircraft cabin longitudinal axis 114a. The aircraft cabin longitudinal axis 114a has respectively equal distances from aircraft cabin walls 18a, 148a of the aircraft cabin 56a which are situated opposite each other. The aircraft cabin longitudinal axis 114a is oriented parallel to the mounting plane of the aircraft cabin 56a. The aircraft cabin aisle 16a extends along the aircraft cabin longitudinal axis 114a. The flight direction 12a extends from a tail of the aircraft towards a nose of the aircraft. In an ideal operation state and viewed perpendicular to the mounting plane, the flight direction 12a is oriented parallel to the aircraft cabin longitudinal axis 114a.

The first aircraft seat device 20a, the second aircraft seat device 22a and the third aircraft seat device 82a are arranged in a seat column 150a of the aircraft cabin 56a. Further aircraft seat devices 152a, which are realized at least substantially identically to the first aircraft seat device 20a, the second aircraft seat device 22a and the third aircraft seat device 82a, are arranged in the seat column 150a of the aircraft cabin 56a. The first aircraft seat device 20a, the second aircraft seat device 22a, the third aircraft seat device 82a and the further aircraft seat devices 152a are arranged one behind the other, in particular in alignment, in the seat column 150a of the aircraft cabin 56a. The seat column 150a is arranged between the aircraft cabin aisle 16a and the aircraft cabin wall 18a. The seat column 150a is oriented orthogonally to seat rows of the aircraft cabin 56a.

The aircraft seat arrangement 10a comprises at least one cabin element 154a, which is mounted on the mounting plane and is arranged in the seat column 150a in front of the first aircraft seat device 20a. In the present case the first aircraft seat device 20a is realized as a foremost aircraft seat device in the seat column 150a. The cabin element 154a is realized, for example, as a cabin monument. The cabin element 154a may be realized, for example, as a stowage compartment, as a coat rack, as a bar or as another element that is deemed expedient by someone skilled in the art. The cabin element 154a comprises an ottoman, which is situated in an aircraft seat region that is arranged between the cabin element 154a and the enclosure 30a of the first aircraft seat device 20a. The aircraft seat arrangement 10a comprises at least one further cabin element 156a, which is mounted on the mounting plane and is arranged in the seat column 150a behind a rearmost aircraft seat device. The further cabin element 156a is provided instead of an ottoman of the rearmost aircraft seat device.

The aircraft cabin 56a comprises a further seat column 158a. The further seat column 158a is arranged between the aircraft cabin aisle 16a and a further aircraft cabin wall 148a, which is arranged opposite the aircraft cabin wall 18a. The aircraft seat arrangement 10a comprises several aircraft seat devices 160a, which are realized mirrored with respect to the first aircraft seat device 20a. The several mirrored aircraft seat devices 160a are arranged one behind the other in the further seat column 158a. In the present case, in particular in a region in which the first aircraft seat device 20a, the second aircraft seat device 22a and the third aircraft seat device 82a are arranged, the seat column 150a and the further seat column 158a are realized mirror-symmetrically to each other with respect to the aircraft cabin longitudinal axis 114a.

In FIGS. 9 to 12 four further exemplary embodiments of the invention are shown. The following descriptions and the drawings are limited essentially to the differences between the exemplary embodiments, wherein with respect to components having the same denomination, in particular with respect to components having the same reference numerals, reference may in principle also be made to the drawings and/or the description of the other exemplary embodiments, in particular of FIGS. 1 to 8. To distinguish the exemplary embodiments, the letter a has been added to the reference numerals of the exemplary embodiment in FIGS. 1 to 8. In the exemplary embodiments of FIGS. 9 to 12 the letter a has been replaced by the letters b to e.

In principle, the exemplary embodiments are at least substantially identical except for a way of filling the free space 70a in order to form a lying-down surface 62a-e.

In FIG. 9 an aircraft seat arrangement 10b is shown in a second exemplary embodiment. The aircraft seat arrangement 10b comprises a first aircraft seat device 20b and a second aircraft seat device 22b. The second aircraft seat device 22b is realized at least substantially identically to the first aircraft seat device 20b. The first aircraft seat device 20b has an enclosure 30b. The second aircraft seat device 22b has an enclosure 32b. The enclosure 32b of the second aircraft seat device 22b forms, at least in a subregion of the enclosure 32b of the second aircraft seat device 22b, a backrest wall 34b. The first aircraft seat device 20b and the second aircraft seat device 22b together form an aircraft seat region 36b for a passenger. The first aircraft seat device 20b comprises a seat bottom 50b. The second aircraft seat device 22b comprises a seat bottom 52b. The seat bottom 52b of the second aircraft seat device 22b has a seat bottom front edge 54b. The first aircraft seat device 20b comprises an ottoman 60b. The second aircraft seat device 22b comprises an ottoman 76b. In a TTL position of the aircraft seat region 36b, between the enclosure 32b of the second aircraft seat device 22b and an access region 48b of the aircraft seat region 36b, there is a free space, which is free of an at least substantially horizontally-extending support surface. The second aircraft seat device 22b comprises a movable leg support element 72b.

In contrast to the first exemplary embodiment, the second aircraft seat device 22b does not comprise a movable support element. The leg support element 72b extends over an entire length of the seat bottom front edge 54b. The leg support element 72b of the second aircraft seat device 22b is arranged between the seat bottom 52b of the second aircraft seat device 22b and the ottoman 60b of the first aircraft seat device 20b.

The first aircraft seat device 20b comprises a movable support element 104b, which is configured to form a portion of a lying-down surface 62b. The support element 104b of the first aircraft seat device 20b is arranged in the aircraft seat region 36b. The support element 104b of the first aircraft seat device 20b is supported movably at the enclosure 30b of the first aircraft seat device 20b. The support element 104b of the first aircraft seat device 20b is supported in a deployable, extractable, pivotable and/or foldable manner in and/or at the enclosure 30b of the first aircraft seat device 20b. The support element 104b of the first aircraft seat device 20a is configured, in a lying-down position 44b of the aircraft seat region 36b, to form a portion of the lying-down surface 62b. In the lying-down position 44b of the aircraft seat region 36b, the passenger can rest at least partially with his/her arm on the support element 104b of the first aircraft seat device 20b. Alternatively, it is conceivable that the support element 104b of the first aircraft seat device 20b is used for depositing personal items of the passenger on the lying-down surface 62b. The support element 104b of the first aircraft seat device 20b is electromechanically movable. In principle, however, it would also be conceivable that the support element 104b of the first aircraft seat device 20b is movable manually.

In the present case, the support element 104b of the first aircraft seat device comprises a functional element 78b, which in the lying-down position 44b of the aircraft seat region 36b is arranged between the enclosure 30b of the first aircraft seat device 20b and the seat bottom 52b of the second aircraft seat device 22b, and which can be utilized by the passenger in the lying-down position 44b of the aircraft seat region 36b. In the present case the functional element 78b is realized as a PED holder. The functional element 78b is integrated in the support element 104b of the first aircraft seat device 20b. The functional element 78b may be realized, for example, as a slot in the support element 104b of the first aircraft seat device 20b, which in particular interrupts the lying-down surface 62b. Alternatively or additionally, the functional element 78b could be realized as a support structure for a PED, which is in the lying-down position 44b extractable and/or unfoldable from the support element 104b of the first aircraft seat device 20b.

In FIG. 10 an aircraft seat arrangement 10c is shown in a third exemplary embodiment. The aircraft seat arrangement 10c comprises a first aircraft seat device 20c and a second aircraft seat device 22c. The second aircraft seat device 22c is realized at least substantially identically to the first aircraft seat device 20c. The first aircraft seat device 20c has an enclosure 30c. The second aircraft seat device 22c has an enclosure 32c. The enclosure 32c of the second aircraft seat device 22c forms, at least in a subregion of the enclosure 32c of the second aircraft seat device 22c, a backrest wall 34c. The first aircraft seat device 20c and the second aircraft seat device 22c together form an aircraft seat region 36c for a passenger. The first aircraft seat device 20c comprises a seat bottom 50c. The second aircraft seat device 20c comprises a seat bottom 52c. The seat bottom 52c of the second aircraft seat device 22c has a seat bottom front edge 54c. The first aircraft seat device 20c comprises an ottoman 60c. The second aircraft seat device 22c comprises an ottoman 76c. The second aircraft seat device 22c comprises a movable leg support element 72c. The leg support element 72c of the second aircraft seat device 22c is configured, in a lying-down position 44c of the aircraft seat region 36c, to form a portion of a lying-down surface 62c.

In contrast to the first and second exemplary embodiments, none of the aircraft seat devices 20c, 22c comprises a support element. In a TTL position of the aircraft seat region 36c, between the enclosure 32c of the second aircraft seat device 22c and an access region 48c of the aircraft seat region 36c, there is a free space, which is free of an at least substantially horizontally-extending support surface. The free space extends in a point between the seat bottom 52c of the second aircraft seat device 22c and the ottoman 60c of the first aircraft seat device 20c as far as the enclosure 32c of the second aircraft seat device 22c. The leg support element 72c of the second aircraft seat device 22c is supported pivotably at the seat bottom 52c of the second aircraft seat device 22c. The leg support element 72c fills the free space at least substantially alone in the region of the lying-down surface 62a. The leg support element 72c of the second aircraft seat device 22c is configured, in the lying-down position 44c of the aircraft seat region 36c, to form a portion of the lying-down surface 62c. In the lying-down position 44c, the leg support element 72c of the second aircraft seat device 22c together with the seat bottom 52c of the second aircraft seat device 22c and the ottoman 60c of the first aircraft seat device 20c forms the lying-down surface 62c. A front edge 106c of the ottoman 60c of the first aircraft seat device 20c is oriented at least substantially orthogonally to a lying-down axis.

In FIG. 11 an aircraft seat arrangement 10d is shown in a fourth exemplary embodiment. The aircraft seat arrangement 10d comprises a first aircraft seat device 20d and a second aircraft seat device 22d. The second aircraft seat device 22d is realized at least substantially identically to the first aircraft seat device 20d. The first aircraft seat device 20d has an enclosure 30d. The second aircraft seat device 22d has an enclosure 32d. The enclosure 32d of the second aircraft seat device 22d forms, at least in a subregion of the enclosure 32d of the second aircraft seat device 22d, a backrest wall 34d. The first aircraft seat device 20d and the second aircraft seat device 22d together form an aircraft seat region 36d for a passenger. The first aircraft seat device 20d comprises a seat bottom 50d. The second aircraft seat device 22d comprises a seat bottom 52d. The seat bottom 52d of the second aircraft seat device 22d has a seat bottom front edge 54d. The first aircraft seat device 20d comprises an ottoman 60d. The second aircraft seat device 22d comprises an ottoman 76d. In a TTL position of the aircraft seat region 36d, between the enclosure 32d of the second aircraft seat device 22d and an access region 48d of the aircraft seat region 36d, there is a free space, which is free of an at least substantially horizontally-extending support surface. The second aircraft seat device 22d comprises a movable leg support element 72d.

In contrast to the first exemplary embodiment, the second aircraft seat device 22d does not comprise a support element. In the present case the first aircraft seat device 20d comprises a movable support element 108d, which is configured to form a portion of a lying-down surface 62d. The support element 108d of the first aircraft seat device 20d is supported movably on the ottoman 60d of the first aircraft seat device 20d. The support element 108d of the first aircraft seat device 20d is supported in a deployable, extractable, pivotable and/or foldable manner in and/or on the ottoman 60d of the first aircraft seat device 20d. The support element 108d is supported displaceably along an axis which is at least substantially parallel to a lying-down axis.

In FIG. 12 an aircraft seat arrangement 10e is shown in a fifth exemplary embodiment. The aircraft seat arrangement 10e comprises a first aircraft seat device 20e and a second aircraft seat device 22e. The second aircraft seat device 22e is realized at least substantially identically to the first aircraft seat device 20e. The first aircraft seat device 20e has an enclosure 30e. The second aircraft seat device 22e has an enclosure 32e. The enclosure 32e of the second aircraft seat device 22e forms, at least in a subregion of the enclosure 32e of the second aircraft seat device 22e, a backrest wall 34e. The first aircraft seat device 20e and the second aircraft seat device 22e together form an aircraft seat region 36e for a passenger. The first aircraft seat device 20e comprises a seat bottom 50e. The second aircraft seat device 22e comprises a seat bottom 52e. The seat bottom 52e of the second aircraft seat device 22e has a seat bottom front edge 54e. The first aircraft seat device 20e comprises an ottoman 60e. The second aircraft seat device 22e comprises an ottoman 76e. In a TTL position of the aircraft seat region 36e, between the enclosure 32e of the second aircraft seat device 22e and an access region 48e of the aircraft seat region 36e, there is a free space, which is free of an at least substantially horizontally-extending support surface. The second aircraft seat device 22e comprises a movable leg support element 72e. The first aircraft seat device 20e comprises a movable support element 108e. The leg support element 72e of the second aircraft seat device 22e and the support element 108e of the first aircraft seat device 20e are each configured, in a lying-down position 44e of the aircraft seat region 36e, to form a portion of a lying-down surface 62e.

In contrast to the fourth exemplary embodiment, the seat bottom 52e of the second aircraft seat device 22e has an alternative shape. The seat bottom front edge 54e comprises two sections 110e, 112e, wherein the two sections 110e, 112e are realized at least substantially as straight lines. In the present case, the seat bottom front edge 54e is realized at least substantially as two straight lines which are angled relative to each other. In principle, a radius could be provided at a kink point of the straight lines which are angled relative to each other.

The invention claimed is:

1. An aircraft seat arrangement with a first aircraft seat device and with a second aircraft seat device, the second aircraft seat device is arranged directly behind the first aircraft seat device and is realized at least substantially identically to the first aircraft seat device,
   wherein the second aircraft seat device has an aircraft seat device longitudinal axis which extends along fastening points of the second aircraft seat device, the fastening points of the second aircraft seat device are arranged one behind the other, and the second aircraft seat device has an aircraft seat device transversal axis which is oriented orthogonally to an aircraft cabin longitudinal axis of an aircraft cabin,
   wherein the first aircraft seat device has an enclosure and the second aircraft seat device has an enclosure which forms a backrest wall at least in a subregion of the enclosure of the second aircraft seat device,
   wherein the first aircraft seat device and the second aircraft seat device together form an aircraft seat region for a passenger, which is arranged at least substantially between the enclosure of the first aircraft seat device and the enclosure of the second aircraft seat device,
   wherein the second aircraft seat device comprises in the aircraft seat region a seat bottom which has a seat bottom front edge, a main extension axis of the seat bottom front edge being oriented at an angle of at least 5 degrees with respect to the aircraft seat device transversal axis of the second aircraft seat device,
   wherein the first aircraft seat device comprises in the aircraft seat region an ottoman, which in a lying-down position of the aircraft seat region together with the seat bottom of the second aircraft seat device forms at least a portion of a lying-down surface of the aircraft seat region, and
   wherein a lying-down direction of the aircraft seat region, which is directed from a head region of the lying-down surface to a foot region of the lying-down surface, is oriented at an angle of at least 30 degrees with respect to the aircraft seat device longitudinal axis of the second aircraft seat device, the lying-down direction being directed away from an access region of the aircraft seat region.

2. The aircraft seat arrangement according to claim 1, wherein a seat distance between identical reference points of the first aircraft seat device and the second aircraft seat device is at most 97 cm.

3. The aircraft seat arrangement according to claim 1, wherein the backrest wall of the second aircraft seat device is concavely curved on a side facing towards the aircraft seat region.

4. The aircraft seat arrangement according to claim 1, wherein the seat bottom of the second aircraft seat device is realized as a seat bench on which the passenger can assume different sitting positions, wherein the seat bottom front edge extends over a length of at least 70 cm.

5. The aircraft seat arrangement according to claim 1, wherein in a TTL position of the aircraft seat region a free space, which is free of an at least substantially horizontally-extending support surface, is arranged between the enclosure of the second aircraft seat device and the access region of the aircraft seat region.

6. The aircraft seat arrangement according to claim 1, wherein an inclination of the seat bottom of the second aircraft seat device can be changed between a TTL position and the lying-down position.

7. The aircraft seat arrangement according to claim 1, wherein the second aircraft seat device comprises at least one movable support element, which is configured to form the portion of the lying-down surface.

8. The aircraft seat arrangement according to claim 1, wherein the second aircraft seat device comprises an armrest unit, which is arranged on an aisle side and is realized so as to be height-adjustable, in particular so as to be lowerable below an upper edge of the seat bottom of the second aircraft seat device.

9. The aircraft seat arrangement according to claim 1, wherein the backrest wall of the second aircraft seat device is adjustable in its orientation and/or shape at least in a subregion, in particular in a lower region, of the backrest wall.

10. The aircraft seat arrangement according to claim 1, wherein the fastening points are configured to couple the second aircraft seat device to a fastening rail of a floor of the aircraft cabin.

11. The aircraft seat arrangement according to claim 1, wherein the head region of the lying-down surface is configured and adapted to support a head of a passenger, and the head region is arranged on a seat bottom of the second aircraft seat device.

12. The aircraft seat arrangement according to claim 1, wherein the foot region of the lying-down surface is configured and adapted to support feet of a passenger, and is arranged on the ottoman of the first aircraft seat device.

13. The aircraft seat arrangement according to claim 1, wherein the angle to the aircraft seat device longitudinal axis at which the lying-down direction is oriented is larger than an angle at which a sitting direction is oriented to the aircraft seat device longitudinal axis, the sitting direction being perpendicular to the seat bottom front edge.

14. The aircraft seat arrangement according to claim 1, wherein the angle to the aircraft seat device longitudinal axis at which the lying-down direction is oriented differs from an angle at which a sitting direction is oriented to the aircraft seat device longitudinal axis, the sitting direction being perpendicular to the seat bottom front edge.

15. The aircraft seat arrangement according to claim 1, wherein the first aircraft seat device comprises at least one movable support element, which is configured to form the portion of the lying-down surface.

16. The aircraft seat arrangement according to claim 15, wherein the at least one movable support element is supported movably on the ottoman of the first aircraft seat device and/or on the enclosure of the first aircraft seat device.

17. The aircraft seat arrangement according to claim 1, wherein the second aircraft seat device comprises at least one movable leg support element, which is coupled with the seat bottom of the second aircraft seat device.

18. The aircraft seat arrangement according to claim 17, wherein the first aircraft seat device comprises at least one movable support element, wherein in the lying-down position of the aircraft seat region, the at least one movable leg support element and the at least one movable support element are arranged directly side by side and form the lying-down surface of the aircraft seat region together with the seat bottom of the second aircraft seat device and the ottoman of the first aircraft seat device.

19. The aircraft seat arrangement according to claim 17, wherein the first aircraft seat device comprises at least one movable support element, wherein the at least one movable leg support element and/or the at least one movable support element comprise/s at least one functional element, which in the lying-down position of the aircraft seat region is arranged between the enclosure of the first aircraft seat device and the seat bottom of the second aircraft seat device, and can be utilized by the passenger in the lying-down position of the aircraft seat region.

20. An aircraft seat device of the aircraft seat arrangement according to claim 1.

* * * * *